(12) United States Patent
Striker et al.

(10) Patent No.: US 11,404,710 B2
(45) Date of Patent: Aug. 2, 2022

(54) ASSEMBLED PORTION OF A SOLID OXIDE FUEL CELL AND METHODS FOR INSPECTING THE SAME

(71) Applicant: Cummins Enterprise LLC, Indianapolis, IN (US)

(72) Inventors: Todd Michael Striker, Ballston Lake, NY (US); Matthew Joseph Alinger, Delmar, NY (US); Luc Stephane Leblanc, Clifton Park, NY (US); Nicole Virginia Gonyeau, Albany, NY (US)

(73) Assignee: Cummins Enterprise LLC, Indianapolis, IN (US)

( * ) Notice: Subject to any disclaimer, the term of this patent is extended or adjusted under 35 U.S.C. 154(b) by 152 days.

(21) Appl. No.: 16/221,852

(22) Filed: Dec. 17, 2018

(65) Prior Publication Data

US 2020/0194811 A1  Jun. 18, 2020

(51) Int. Cl.
| | |
|---|---|
| *H01M 8/0438* | (2016.01) |
| *H01M 8/12* | (2016.01) |
| *H01M 8/04746* | (2016.01) |
| *H01M 8/2485* | (2016.01) |

(52) U.S. Cl.
CPC ..... *H01M 8/0438* (2013.01); *H01M 8/04746* (2013.01); *H01M 8/12* (2013.01); *H01M 8/2485* (2013.01); *H01M 2008/1293* (2013.01)

(58) Field of Classification Search
CPC .. H01M 8/0438; H01M 8/04746; H01M 8/12; H01M 8/2485; H01M 2008/1293; H01M 8/04664; H01M 10/4228; Y02E 60/50
See application file for complete search history.

(56) References Cited

U.S. PATENT DOCUMENTS

| | | | |
|---|---|---|---|
| 3,819,352 A | 6/1974 | Pei | |
| 5,217,305 A | 6/1993 | Yamakawa et al. | |
| 5,235,846 A * | 8/1993 | Fanciullo | G01M 3/226 73/19.1 |

(Continued)

FOREIGN PATENT DOCUMENTS

| | | | | |
|---|---|---|---|---|
| CN | 101065874 | * | 10/2007 | |
| CN | 101065874 A | * | 10/2007 | ........ H01M 8/04089 |

(Continued)

OTHER PUBLICATIONS

Wikipedia, Atmospheric Pressure, Dec. 10, 2021, pp. 1-5. (Year: 2021).*

(Continued)

*Primary Examiner* — Kaity V Chandler
(74) *Attorney, Agent, or Firm* — Barnes & Thornburg LLP

(57) ABSTRACT

An intermediate solid oxide fuel cell (SOFC) stage and methods for inspecting an assembled portion of an SOFC are presented. One method for inspecting an assembled portion of an SOFC includes applying a pneumatic constraint to a fluid, where the fluid is in communication with the assembled portion of the SOFC, determining a quality control parameter of the assembled portion of the SOFC in response to the pneumatic constraint, and ascertaining health of the assembled portion of the SOFC based on the quality control parameter. The assembled portion of the SOFC includes a metallic interconnect, where the metallic interconnect includes a flow field.

20 Claims, 9 Drawing Sheets

(56) References Cited

U.S. PATENT DOCUMENTS

| | | | |
|---|---|---|---|
| 6,156,447 A * | 12/2000 | Bette | H01M 8/04089 |
| | | | 429/432 |
| 6,475,651 B1 * | 11/2002 | Wilkinson | H01M 8/04 |
| | | | 429/431 |
| 7,674,537 B2 | 3/2010 | Ryoichi et al. | |
| 7,748,259 B2 | 7/2010 | Faidi et al. | |
| 7,989,118 B2 | 8/2011 | Bourgeois et al. | |
| 8,654,920 B2 | 2/2014 | Ahn et al. | |
| 8,669,017 B2 * | 3/2014 | Seitz | H01M 8/04679 |
| | | | 429/443 |
| 8,703,362 B2 | 4/2014 | Blanchard et al. | |
| 8,720,252 B2 | 5/2014 | Park et al. | |
| 8,790,847 B2 | 7/2014 | Larsen et al. | |
| 8,945,795 B2 | 2/2015 | Berggren et al. | |
| 9,234,843 B2 | 1/2016 | Sopori et al. | |
| 9,368,820 B2 | 6/2016 | Strutt et al. | |
| 9,653,743 B2 | 5/2017 | Ahn et al. | |
| 9,784,625 B2 | 10/2017 | Couse et al. | |
| 2003/0039869 A1 * | 2/2003 | Murakami | H01M 8/043 |
| | | | 429/432 |
| 2003/0184740 A1 | 10/2003 | Paradis | |
| 2004/0216832 A1 * | 11/2004 | Mercuri | H01M 8/0247 |
| | | | 156/219 |
| 2005/0008908 A1 * | 1/2005 | Kaye | H01M 8/04186 |
| | | | 422/198 |
| 2005/0064266 A1 | 3/2005 | Abdou et al. | |
| 2005/0263393 A1 | 12/2005 | Paz | |
| 2005/0271905 A1 * | 12/2005 | Dunn | H01M 8/04089 |
| | | | 429/11 |
| 2007/0207355 A1 * | 9/2007 | Yoshida | H01M 8/04679 |
| | | | 429/444 |
| 2007/0277367 A1 * | 12/2007 | Stelter | H01M 8/247 |
| | | | 29/730 |
| 2009/0035612 A1 * | 2/2009 | Suematsu | H01M 16/006 |
| | | | 429/432 |
| 2009/0047553 A1 * | 2/2009 | Kizaki | H01M 8/04089 |
| | | | 429/410 |
| 2009/0117420 A1 * | 5/2009 | Nakakubo | H01M 8/04388 |
| | | | 429/410 |
| 2009/0166908 A1 | 7/2009 | Lee et al. | |
| 2009/0169927 A1 * | 7/2009 | Sato | H01M 8/04395 |
| | | | 429/492 |
| 2010/0055521 A1 * | 3/2010 | Umayahara | H01M 8/04619 |
| | | | 429/429 |
| 2010/0112403 A1 * | 5/2010 | Berggren | H01M 8/0258 |
| | | | 429/452 |
| 2010/0237524 A1 | 9/2010 | Chen | |
| 2011/0171549 A1 * | 7/2011 | Kato | H01M 8/04225 |
| | | | 429/429 |
| 2011/0236774 A1 * | 9/2011 | Park | H01M 8/04119 |
| | | | 429/429 |
| 2014/0017579 A1 | 1/2014 | Hata | |
| 2015/0093661 A1 | 4/2015 | Watanabe et al. | |
| 2016/0141677 A1 * | 5/2016 | Imanishi | H01M 8/04225 |
| | | | 429/429 |
| 2016/0141706 A1 * | 5/2016 | Dean | H01M 8/2485 |
| | | | 429/461 |
| 2016/0190614 A1 | 6/2016 | Striker et al. | |
| 2017/0110746 A1 | 4/2017 | Mack et al. | |
| 2018/0166678 A1 | 6/2018 | Puranen et al. | |
| 2018/0166716 A1 * | 6/2018 | Imanishi | H01M 8/04298 |
| 2018/0166717 A1 * | 6/2018 | Ryu | H01M 8/04231 |
| 2019/0033164 A1 * | 1/2019 | Ing | B60L 50/64 |
| 2019/0140293 A1 * | 5/2019 | Blanchet | H01M 8/04089 |

FOREIGN PATENT DOCUMENTS

| | | | | |
|---|---|---|---|---|
| CN | 101443944 A | * | 5/2009 | H01M 8/0271 |
| CN | 100533837 C | * | 8/2009 | H01M 8/00 |
| CN | 101536234 A | * | 9/2009 | H01M 8/00 |
| CN | 102097634 | * | 6/2011 | |
| CN | 103441296 A | * | 12/2013 | |
| CN | 108232248 A | * | 6/2018 | G01D 21/02 |
| DE | 102004044597 B3 | | 2/2006 | |
| EP | 0410420 B1 | | 3/1994 | |
| WO | WO-03096459 A1 | * | 11/2003 | H01M 8/04225 |
| WO | WO-2006096956 A1 | * | 9/2006 | H01M 8/04246 |
| WO | WO-2008071402 A1 | * | 6/2008 | H01M 8/04089 |
| WO | WO-2011062358 A2 | * | 5/2011 | H01M 8/2404 |

OTHER PUBLICATIONS

Talbert et al., "Conductive Cooling of High-Power RIB Targets", Nuclear Physics A, vol. 701, Issue: 1-4, pp. 303-311, Apr. 22, 2002.

Gilles et al., "Swiss SOFC Integration Activities: Stacks, Systems, and Applications", CHIMIA International Journal for Chemistry, vol. 58, Issue: 12, pp. 879-886, Dec. 2004.

Sparrow et al., "The Design of Cold Plates for the Thermal Management of Electronic Equipment", Heat Transfer Engineering, vol. 27, Issue: 07, pp. 6-16, 2006.

Aieta et al., "Applying Infrared Thermography as a Quality-Control Tool for the Rapid Detection of Polymer-Electrolyte-Nembrane-Fuel-Cell Catalyst-Layer-Thickness Variations", Journal of Power Sources, vol. 211, pp. 04-11, Aug. 1, 2012.

Zhang et al., "Plasma-Sprayed Y2O3-Stabilized ZrO2 Electrolyte With Improved Interlamellar Bonding for Direct Application to Solid Oxide Fuel Cells", Journal of Fuel Cell Science and Technology, vol. 11, Issue: 3, pp. 1-6, Jan. 24, 2014.

Perry., "Industry Developments: Cooling Solar Power Inverters", Advanced Thermal Solutions, retrieved from https://www.qats.com/cms/2016/11/21/industry-developments-cooling-solar-power-inverters/, retrieved on Nov. 3, 2017, pp. 01-08, Nov. 21, 2016.

Jang et al., "Electromechanical Diagnostic Method for Monitoring Cracks in Polymer Electrolyte Fuel Cell Electrodes", International Journal of Hydrogen Energy, vol. 42, Issue: 16, pp. 11644-11653, Apr. 20, 2017.

International PCT Search Report and Written Opinion for PCT Application No. PCT/US2019/066738, completed Feb. 7, 2020.

* cited by examiner

ASSEMBLED PORTION OF A SOLID OXIDE FUEL CELL AND METHODS FOR INSPECTING THE SAME

BACKGROUND

Embodiments of the present specification relate generally to inspection of solid oxide fuel cells, and more particularly to assembled portions of a solid oxide fuel cell and methods for inspecting the assembled portions of the solid oxide fuel cell.

Electrochemical cells such as solid oxide fuel cells (SOFCs) convert chemical energy to electrical energy with high efficiency and low emissions. In a solid oxide fuel cell (SOFC), a cathode reduces oxygen on one side of a hermetically sealed electrolyte and supplies oxygen ions to the electrolyte. The electrolyte facilitates conduction of the oxygen ions at high temperature to the anode, where the ions oxidize and react with hydrogen to form water. Electrons, thus generated are conducted through a resistive load connected to the anode and the cathode to perform work.

Anode-supported SOFCs manufactured using traditional ceramic sintering technologies are limited by maximum manufacturable cell size. Further, sinter-based manufacturing facilities require large capital investment. Metallic interconnect-supported SOFCs can utilize thermal spray deposition to deposit active layers and offer a variety of manufacturing benefits as well as a rugged design. In conventional methods of inspecting the SOFCs, the manufactured SOFCs are formed in a stack, and this stack of SOFCs is inspected for fluid leak and efficiency. Some known methods for inspecting the SOFCs include non-destructive electrochemical testing. However, the non-destructive electrochemical testing methods require high temperature testing configurations and seals that can withstand the high temperature and can be removed subsequently in a non-destructive manner. For example, detection of defects in the sintered SOFCs requires high temperature treatment to sinter before testing. Similarly, detection of leaks in an interconnect seal formed by melting of glasses in an SOFC stack requires high temperature treatment to melt the glasses. Requirement of high temperature heat treatment prior to detection undesirably adds cost and cycle time. Imaging techniques such as microscopy techniques, stereomicroscopy techniques, and image analysis, along with the use of dye penetrants are undesirable as such imaging techniques are generally unwieldy and expensive to be used during the manufacturing of the SOFCs.

BRIEF DESCRIPTION

In one aspect, a method for inspecting an assembled portion of a solid oxide fuel cell (SOFC) is disclosed. The method includes applying a pneumatic constraint to a fluid, where the fluid is in communication with the assembled portion of the SOFC, determining a quality control parameter of the assembled portion of the SOFC in response to the pneumatic constraint, and ascertaining health of the assembled portion of the SOFC based on the quality control parameter, where the assembled portion of the SOFC includes a metallic interconnect including a flow field.

In another aspect, a method for repeatedly inspecting an assembled portion of a solid oxide fuel cell (SOFC) during manufacturing of the SOFC is disclosed. The method includes applying a pneumatic constraint to a fluid, where the fluid is in communication with the assembled portion of the SOFC, determining a quality control parameter of the assembled portion of the SOFC in response to the pneumatic constraint, and ascertaining health of one or more sequentially built layers of the assembled portion of the SOFC based on the quality control parameter, where the assembled portion of the SOFC includes a metallic interconnect that includes a flow field, and the SOFC includes a manifold in fluidic communication with the assembled portion of the SOFC.

In yet another aspect, an intermediate solid oxide fuel cell (SOFC) is disclosed. The intermediate SOFC includes an assembled portion and a manifold. The assembled portion includes a metallic interconnect that includes a flow field. Also, the manifold is configured to be in fluidic communication with the assembled portion.

DRAWINGS

These and other features, aspects, and advantages of the present specification will become better understood when the following detailed description is read with reference to the accompanying drawings in which like characters represent like parts throughout the drawings.

DETAILED DESCRIPTION

Figure 1:
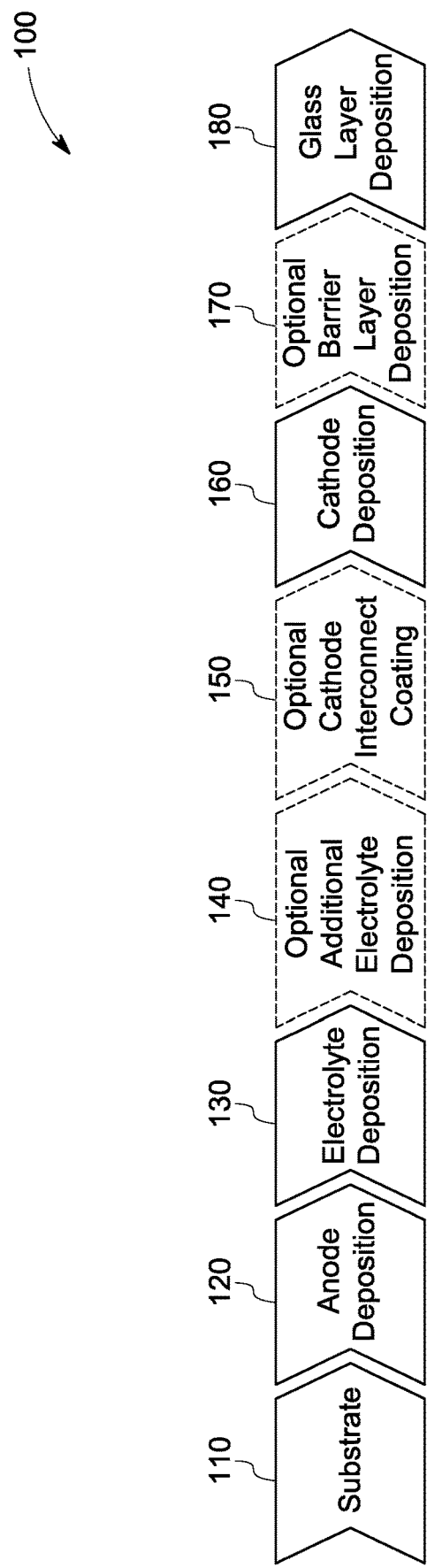
FIG. 1 illustrates steps for formation of an SOFC in a layer by layer assembling method, in accordance with some embodiments of the present specification.

One or more specific embodiments of the present specification are described hereinafter. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this specification.

When introducing elements of various embodiments of the present specification, the articles "a," "an," "the," and "said" are intended to mean that there are one or more of the elements. The terms "comprising," "including," and "having" are intended to be inclusive and mean that there may be additional elements other than the listed elements.

The present specification provides metal-supported solid oxide fuel cells (SOFCs) and methods for inspecting an assembled portion of SOFCs using pneumatic quality control. The structures and methods described herein address noted shortcomings in the art such as, for example, lack of proper, easy, and quick inspection, and difficulty in selection or repair of the SOFCs based on the inspection before stacking the SOFCs. The structures and methods described herein may be particularly useful in understanding the health of a part or whole of an SOFC before the SOFCs are stacked to form an SOFC stack. Particularly, the structures and methods are useful in inspecting and understanding the health of sequentially assembled portions of each SOFC, during various stages of manufacture or assembly of the SOFCs.

To more clearly and concisely describe and point out the subject matter, the following definitions are provided for specific terms, which are used throughout the following description and the appended claims, unless specifically denoted otherwise with respect to particular embodiments. An "intermediate SOFC" refers to an SOFC unit in its manufacturing stage or a manufactured SOFC. A "manufactured SOFC" is an individual SOFC unit that is completely built and optionally cured. The intermediate SOFC is not subjected to a heat-treatment at a temperature greater than 900 degrees Celsius. Further, an SOFC unit in its manufacturing stage is an individual SOFC unit under construction that may include one or more layers. The layer or layers of the individual SOFC unit under construction may be optionally cured at a temperature below 900 degrees Celsius. The manufactured SOFC is also not sintered at temperatures greater than 900 degrees Celsius. An "individual SOFC unit" is a single unit of an SOFC prior to stacking to form an SOFC stack. The manufactured SOFC is ready for stacking as is as a repeating unit in an SOFC stack. Two or more manufactured SOFCs may be stacked to form an SOFC stack. As used herein, "operation of an SOFC" refers to the operation of the manufactured SOFC in an SOFC stack.

Further, as used herein, an "assembled portion" of the SOFC includes one or more layers of the intermediate SOFC, where the layers are provided, assembled, or built in situ to eventually form the SOFC. The assembled portion of the SOFC may not include peripheral parts of the SOFC that are built or assembled to pass fluid to the assembled portion or to facilitate stacking or operation of the SOFC. Inspection of an assembled portion includes inspection of any one layer or more than one layer of the assembled portion of the SOFC. Further, inspection of the assembled portion may be carried out at any stage of the manufacturing or after manufacturing of the individual SOFC unit.

A "sequentially assembled portion" of the SOFC is an assembled portion that results from a successive layer by layer deposition method. The terms "sequentially assembled portion" and "sequentially manufactured assembled portion" are used interchangeably in the present specification. A "sequentially manufactured SOFC" is an SOFC that results from a sequentially assembled portion.

Pneumatic properties, such as, for example, permeance (alternatively permeability) or flow resistance of a fluid, may be used to monitor the health of one or more layers of an SOFC, where the SOFC is generally sequentially manufactured. Further, a relationship between the pneumatic properties and performance of the SOFC may be used to predict performance of the SOFC, prior to stacking. As will be appreciated, the pneumatic properties of the different layers of the SOFC are correlated to the future performance of each SOFC. Accordingly, determining the pneumatic properties of one or more layers of each SOFC provides a prognosis regarding the future health of that SOFC. In accordance with the diagnosis and/or prognosis, if the SOFC is found to be defective, a pre-emptive determination may be made regarding removal or repair of the SOFC before stacking the SOFC. Pre-emptive determination regarding removal or repair of the SOFC ensures that the resultant SOFC stack is made with non-defective SOFCs. The unique method discussed herein allows for a highly reliable quality control of the SOFCs during manufacturing and/or before stacking.

In certain embodiments, the assembled portion of the SOFC includes a metallic interconnect. The metallic interconnect provides mechanical support to the SOFC and acts as a substrate for deposition of further layers in constructing the SOFC. The metallic interconnect includes a flow field for one or more fluids to pass through. The flow field includes metallic interconnect channels that distribute the fluid such as a fuel or an oxidant in an active area of the SOFC. The metallic interconnect may include an anode flow field to supply a fuel to the anode, a cathode flow field to supply an oxidant to the cathode, or may have both the anode flow field and the cathode flow field. In some embodiments, for inspection of an assembled portion of the SOFC, the flow field of the metallic interconnect may be sealed. By way of example, the flow field of the metallic interconnect may be sealed using coatings, such as thermal sprayed coatings. The metallic interconnect-supported SOFC in combination with the thermal sprayed coatings that are used to seal the flow field are used for measuring pneumatic properties of the flow field channels and any coating deposited thereon. The sequential nature of SOFC manufacturing enables measurement of a similar set of one or more properties corresponding to different layers of the SOFC. Consequently, the similar set of one or more properties corresponding to the different layers of the SOFC may be measured at different stages of the manufacturing process of the SOFC.

Embodiments of the methods for inspecting an assembled portion use a fluid that is in communication with the assembled portion. The method includes applying a pneumatic constraint to the fluid that is in communication with the assembled portion, determining a quality control parameter of the assembled portion of the SOFC in response to the applied pneumatic constraint, and ascertaining health of the assembled portion based on the quality control parameter.

An SOFC includes an anode, a cathode, and an electrolyte disposed in between the anode and the cathode. The SOFC further includes a metallic interconnect to support building layers of the anode, electrolyte, and cathode. Further, the metallic interconnect is also used as a mechanical support for joining or stacking of individual SOFCs to form an SOFC stack to increase the power output from the SOFC stack. Generally, in an SOFC stack, a glass layer is used as a seal between the electrolyte of the SOFC and a metallic interconnect of an adjacent SOFC. The SOFC may optionally include a barrier layer to prevent undesirable chemical reactions of the metallic interconnect with the glass layer. The SOFC may also optionally include a cathode interconnect coating disposed between the cathode of the SOFC and the metallic interconnect of the adjacent SOFC.

In certain embodiments, layers of a first electrode (for example, an anode), an electrolyte, a second electrode (for example, a cathode), and a sealing glass may be deposited in order of succession on a substrate during manufacturing of an SOFC. Additionally, optional coatings may be added between deposition of these layers to minimize or eliminate occurrence of degradation between one or more adjacent layers that may adversely affect the performance of the SOFC and may decrease the commercial life of an SOFC stack having that SOFC. A single manufacturing line using sequential manufacturing steps to deposit various layers on the metallic interconnect results in a simplified process for manufacturing an individual unit of metallic interconnect-supported SOFC.

Steps for sequential manufacturing of a metallic interconnect-supported SOFC, in accordance with some aspects of the present specification, are illustrated in method 100 of FIG. 1. At step 110, a metallic interconnect substrate is provided. The metallic interconnect may have one or more flow fields. In some embodiments the metallic interconnect-supported SOFC is a planar SOFC that has a planar metallic interconnect. Further, a planar metallic interconnect has planes of anode and cathode flow fields arranged in parallel to each other. The planar metallic interconnect provides improved toughness and durability for the SOFC. A manifold may be integrated with the metallic interconnect. The manifold provides a path to supply fluid for the inspection of one or more layers of the assembled portion by passing the fluid through one or more flow fields of the metallic interconnect. During the inspection of the assembled portion, the manifold or a portion of the manifold may be sealed. In addition, pressure applying devices may be used to control the fluid flow. Also, measurement devices may be used to measure the quality control parameters.

At step 120 of FIG. 1, an anode layer is deposited on an anode flow field of the metallic interconnect. Also, at step 130, a layer of electrolyte is deposited on the anode layer. There may be an optional deposition of an additional electrolyte at step 140. Moreover, an optional cathode interconnect coating may be disposed on a cathode flow field of the metallic interconnect, at step 150. A cathode layer may be deposited on the layer of electrolyte or on the optional additional electrolyte if the additional electrolyte is present, as indicated by step 160.

An optional barrier layer may be deposited on a non-active region of the metallic interconnect at step 170. Further, at step 180, a sealing glass layer may be deposited on the optional barrier layer or directly on the non-active region of the metallic interconnect, if the optional barrier layer is not present. It should be appreciated that the sequence of deposition of layers may be altered without altering the actual sequence of the individual layers. By way of example, the optional cathode interconnect coating may be deposited any time after the substrate has been formed. Further, the cathode may be deposited after the optional barrier layer deposition step 170 or after the glass layer deposition step 180. Such varied processes are to be considered as part of the process depicted in FIG. 1. The sequential manufacturing process 100 of FIG. 1 results in a manufactured SOFC. It may be noted that the SOFC may further be subjected to additional curing or sintering steps. However, the embodiments of the methods presented herein requires no additional curing or sintering steps. It may be further noted that processing temperatures applied to the metal-supported assembled portion at various steps of method 100 do not exceed the operating temperatures of SOFCs, which is typically between 700 degrees Celsius and 900 degrees Celsius.

Moreover, it may be noted that the manufactured SOFC is ready to be deployed as is to build an SOFC stack. It may further be noted that the SOFC stack may be built by using the manufactured SOFC as repeating units, without using any other additional parts to form the SOFC stack. Each repeating unit of manufactured SOFC provides an incremental voltage to the SOFC stack during operation of the SOFC stack.

An incremental voltage associated with each individual manufactured SOFC during operation of the SOFC stack is a function of one or more properties of the SOFCs. Design specific properties such as permeance and a pressure drop associated with the fuel or oxidant (e.g., air) across the flow field of an SOFC may change an overall operating voltage of the SOFC stack. Therefore, it is desirable to adjust anode and cathode permeability of the SOFC to balance mass transport polarization, activation polarization, conductivity, and mechanical properties of the SOFC. Further, it is desirable to have a sufficiently low value of an electrolyte permeability to obtain high open circuit voltage of the SOFC stack and high operating voltage under a load. Furthermore, it is desirable to have a high hermeticity between the anode flow field and the cathode flow field in the metallic interconnect. The high hermeticity between the anode and cathode flow fields aids in reducing operating voltage losses in the SOFC stack.

The SOFC includes an assembled portion and the assembled portion of the SOFC includes the metallic interconnect. For example, the metallic interconnect provided as the substrate at step 110 is an assembled portion of the SOFC. In this embodiment, the assembled portion is devoid of any other layers. In some embodiments, an assembled portion of the SOFC includes one or more sequentially built layers of the SOFC resulting from the manufacturing steps depicted in FIG. 1. In some embodiments, in addition to the assembled portion, the SOFC further includes a manifold in fluidic communication with the assembled portion of the SOFC. The fluidic communication/connection is said to be established between the manifold and the assembled portion when a static or a flowing fluid exists between the manifold and the assembled portion. The fluidic communication between the manifold and the assembled portion aids in the inspection of the assembled portion. In certain embodiments, the SOFC may be coupled to a seal. The seal may be external to the SOFC structure and provided to facilitate the fluidic communication between the assembled portion and the manifold. It may be appreciated that in some embodiments, the seal may be provided only temporarily during inspection of the assembled portion.

Inspecting an assembled portion of the SOFC includes inspecting the substrate, inspecting one or more layers built on the substrate, or jointly inspecting the substrate and the one or more layers built on the substrate for defects. Defects of an assembled portion may include numerous flaws, including, but not limited to, undesired holes or cracks, weak sections, deviations in any perforations or any dimensions, or any combinations thereof in any one or more layers of the assembled portion. Examples of defects that may affect the health of the metallic interconnect include, but not limited to, braze defects and misalignment of sheet metal of the metallic interconnect that may cause a leak during operation of a manufactured SOFC. By way of example, the misalignment of the sheet metal may occur when the sheet metal is joined to form the metallic interconnect. Defects in the assembled portion may lead to a decay in the performance of a manufactured SOFC during operation. By way of example, defects in the substrate may adversely affect the performance of a manufactured SOFC that includes the substrate, once the SOFC is assembled in an SOFC stack for the production of power.

Figure 2A:
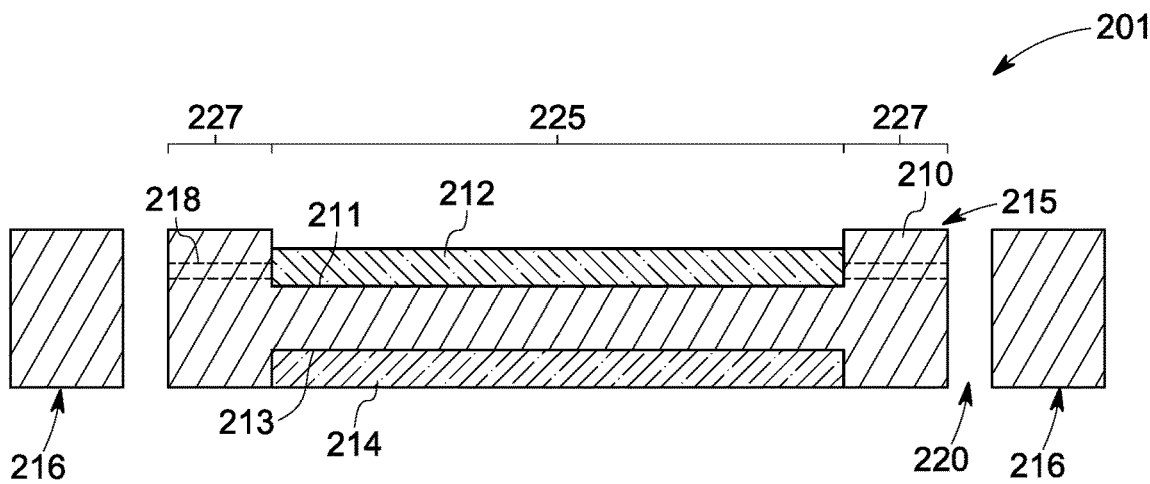
FIG. 2A is a cross-sectional diagram of an intermediate SOFC, where the intermediate SOFC includes a metallic interconnect as an assembled portion, in accordance with some embodiments of the present specification.
Figure 2B:
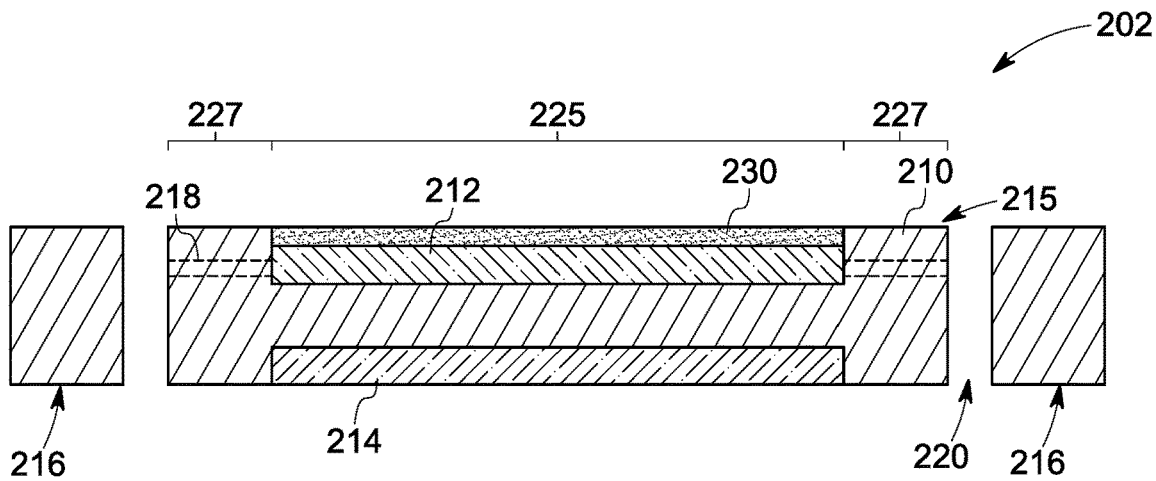
FIG. 2B is a cross-sectional diagram of an intermediate SOFC, where the intermediate SOFC includes a metallic interconnect and a first deposited layer as an assembled portion, in accordance with some embodiments of the present specification.
Figure 2C:
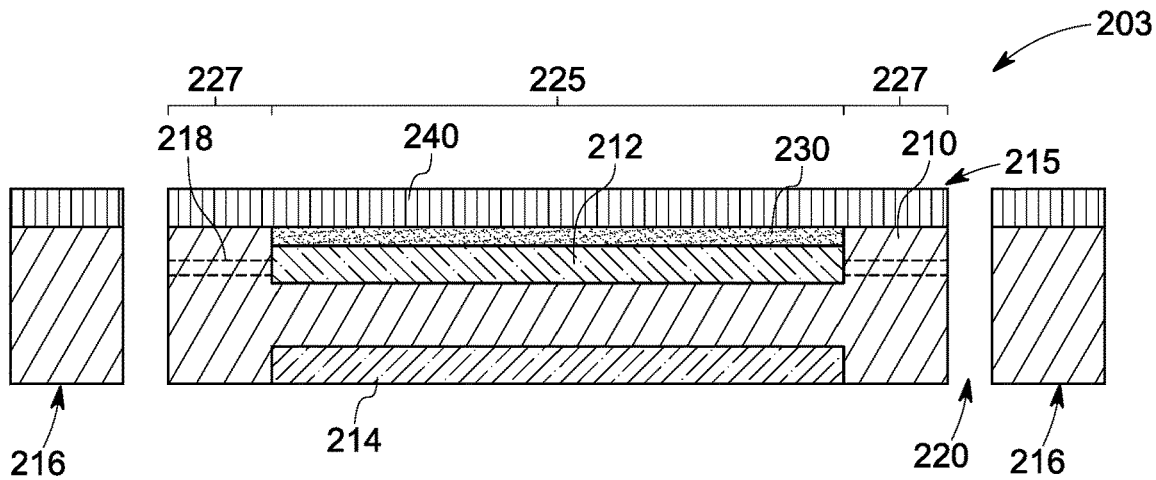
FIG. 2C is a cross-sectional diagram of an intermediate SOFC, where the intermediate SOFC includes a metallic interconnect, a first deposited layer, and a second deposited layer as an assembled portion, in accordance with some embodiments of the present specification.
Figure 2D:
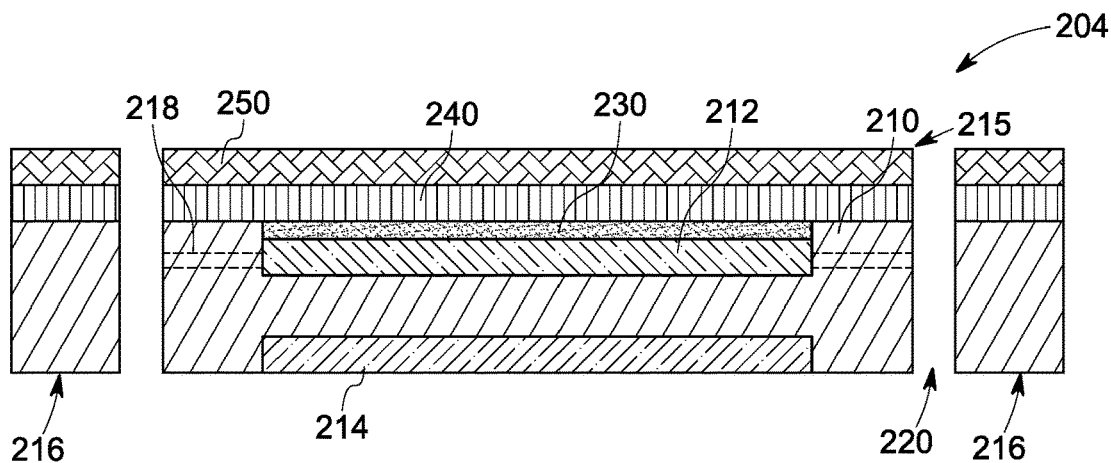
FIG. 2D is a cross-sectional diagram of an intermediate SOFC, where the intermediate SOFC includes a metallic interconnect, a first deposited layer, a second deposited layer, and a third deposited layer as an assembled portion, in accordance with some embodiments of the present specification.
Figure 2E:
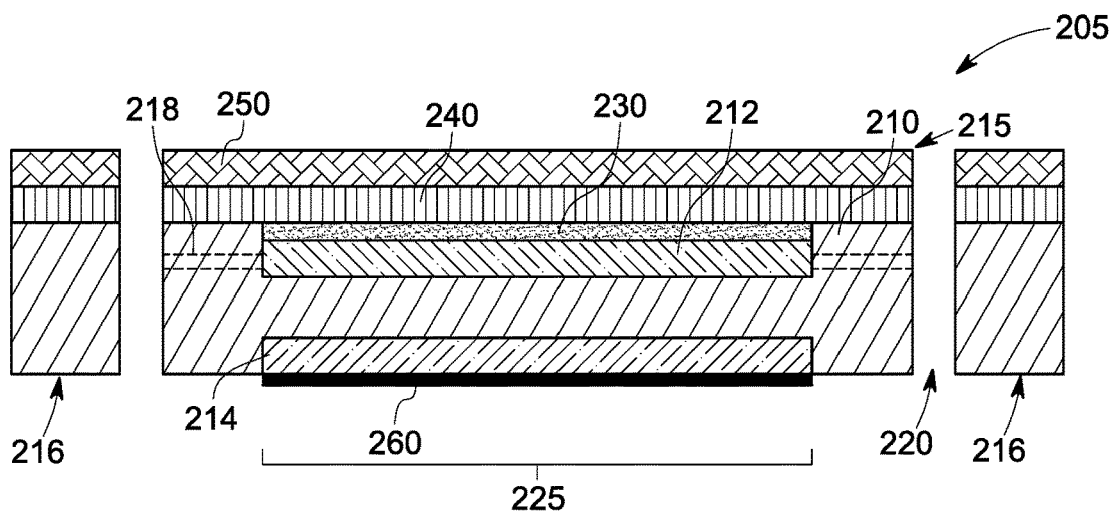
FIG. 2E is a cross-sectional diagram of an intermediate SOFC, where the intermediate SOFC includes a metallic interconnect, a first deposited layer, a second deposited layer, a third deposited layer, and a fourth deposited layer as an assembled portion, in accordance with some embodiments of the present specification.
Figure 2F:
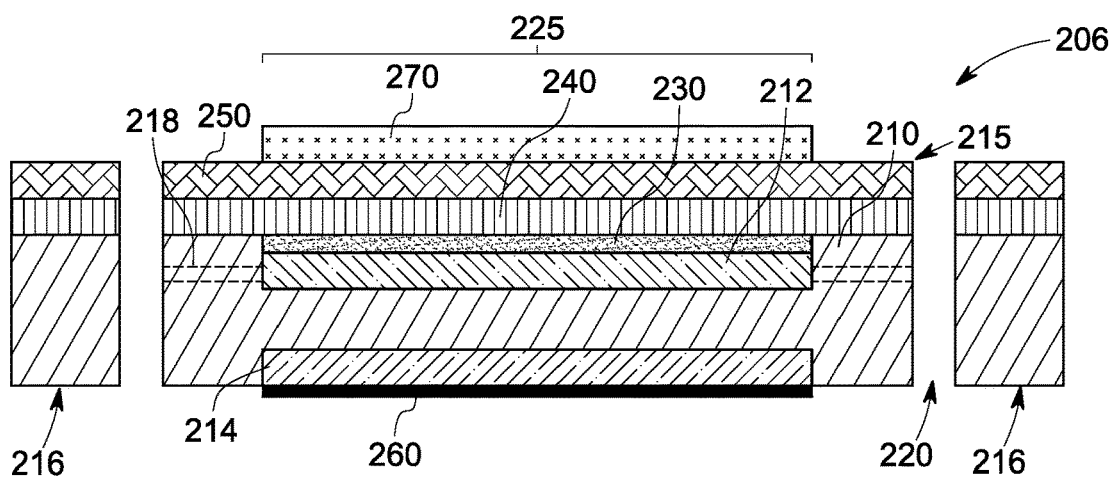
FIG. 2F is a cross-sectional diagram of an intermediate SOFC, where the intermediate SOFC includes a metallic interconnect, a first deposited layer, a second deposited layer, a third deposited layer, a fourth deposited layer, and a fifth deposited layer as an assembled portion, in accordance with some embodiments of the present specification.
Figure 2G:
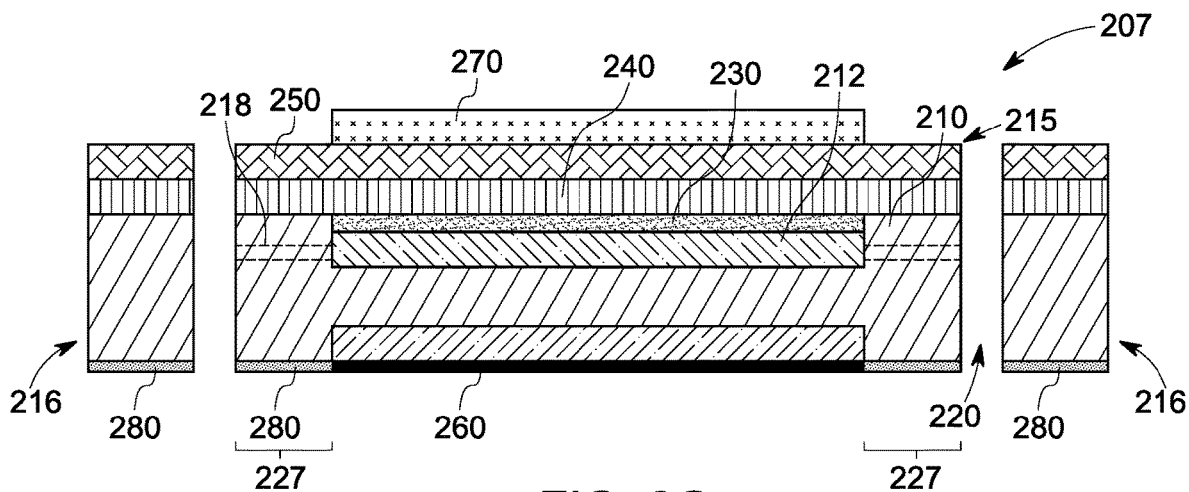
FIG. 2G is a cross-sectional diagram of an intermediate SOFC, where the intermediate SOFC includes a metallic interconnect, a first deposited layer, a second deposited layer, a third deposited layer, a fourth deposited layer, a fifth deposited layer, and a sixth deposited layer as an assembled portion, in accordance with some embodiments of the present specification.
Figure 2H:
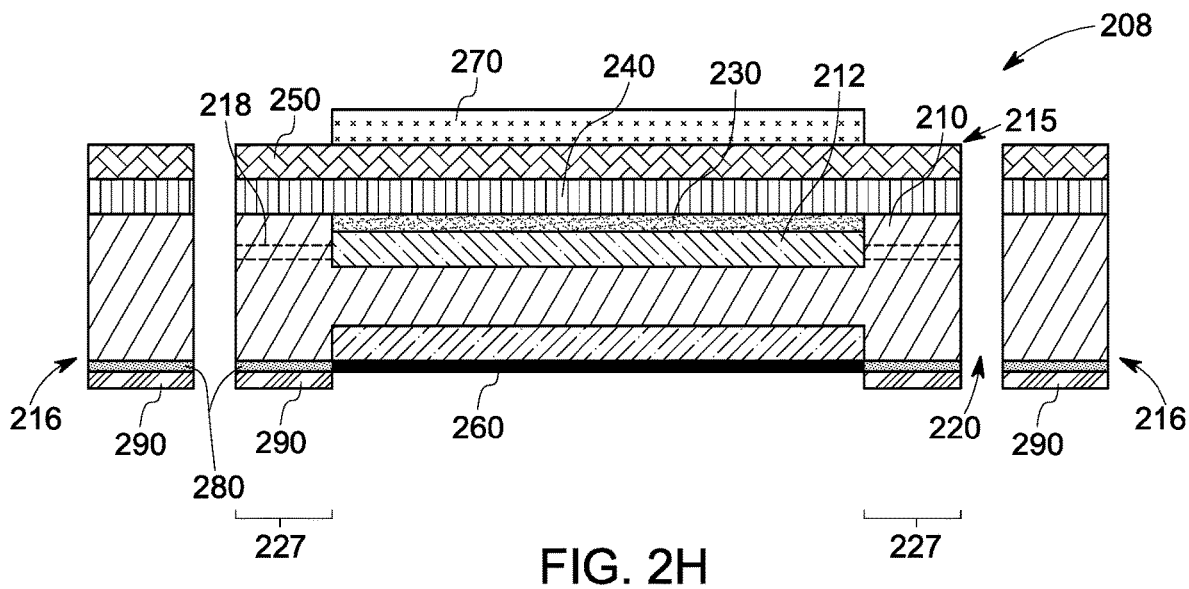
FIG. 2H is a cross-sectional diagram of an intermediate SOFC, where the intermediate SOFC includes a metallic interconnect, a first deposited layer, a second deposited layer, a third deposited layer, a fourth deposited layer, a fifth deposited layer, a sixth deposited layer, and a seventh deposited layer as an assembled portion, in accordance with some embodiments of the present specification.

FIGS. 2A-2I illustrate cross-sectional views of different embodiments of an intermediate SOFC. As previously noted, the intermediate SOFC is an SOFC structure that is in its building or manufacturing stage or a manufactured SOFC. FIGS. 2A-2G and 2I illustrate various embodiments of SOFCs in corresponding manufacturing stages. Also, FIG. 2H illustrates a manufactured SOFC. It may be noted that one or more layers of the SOFCs in FIGS. 2B-2I may have been subjected to some curing treatment. However, these layers may not have been subjected to any sintering treatment or exposed to temperatures above traditional SOFC operating temperatures. More specifically, curing or other heat-treatment processes may be conducted at temperatures less than about 900 degrees Celsius. In some embodiments, the methods of inspection discussed herein are employed to inspect an assembled portion of an intermediate SOFC. In other embodiments, the methods of inspection may also be applied to inspect one or more assembled portions of any SOFC.

FIG. 2A illustrates a cross-sectional view of an intermediate SOFC 201 that includes a planar metallic interconnect 210. The metallic interconnect 210 may be used as a substrate for the deposition of other layers while building the SOFC. The intermediate SOFC 201 includes an assembled portion 215 and an end portion 216. In FIG. 2A, the assembled portion 215 of the intermediate SOFC 201 includes the metallic interconnect 210 having a flow field 212. In the embodiment shown in FIG. 2A, the assembled portion includes only the metallic interconnect 210. It may be appreciated that the end portion 216 of the intermediate SOFC 201 is an extended portion of the metallic interconnect 210. A manifold 220 is formed between the assembled portion 215 and the end portion 216 of the intermediate SOFC 201. The manifold 220 is configured to be in fluidic communication with the flow field 212 of the metallic interconnect 210 through a plenum 218. Thus, during inspection of the assembled portion, a fluid may be passed from the manifold 220 to the flow field 212 through the plenum.

As previously noted, the end portion 216 may be formed as an extension to the assembled portion 215 during formation of the assembled portion 215. Alternatively, the end portion 216 may be separately formed and attached to the assembled portion 215 during manufacturing of the intermediate SOFC 201. In certain embodiments, the end portion 216 is also formed using the same material as the metallic interconnect 210. In the example embodiment illustrated in FIG. 2A, the intermediate SOFC 201 is manufactured as one piece that has both the assembled portion 215 and the extended end portion 216. Further, both the assembled portion 215 and the end portion 216 are manufactured from the same metallic material. In this example, the intermediate SOFC 201 also includes holes to form the manifold 220, passages to act as the plenum 218, and channels to act as the flow field 212.

Moreover, FIG. 2A further illustrates an active region 225 on a surface of the assembled portion 215. The active region 225 is an area of the surface of assembled portion 215 that facilitates generation of power in the SOFC 201. The active region 225 is generally perpendicular to movement of electrons in the SOFC having a planar metallic interconnect. Surface regions of the metallic interconnect 210 excluding the active region 225 may be considered as a non-active region 227 of the assembled portion 215. For example, in FIG. 2A, the surface area of the metallic interconnect 210 that is covered by the flow field 212 is the active region 225 and surface regions of the metallic interconnect 210 that are in between the flow field 212 and the manifold 220 are the non-active regions 227 of the assembled portion 215.

The flow field 212 may be a first flow field. The first flow field 212 is positioned on a first surface 211 of the metallic interconnect 210. In some of these embodiments, the metallic interconnect 210 also includes a second flow field 214 disposed on a second surface 213 of the metallic interconnect 210. In an SOFC having the planar metallic interconnect 210, the first surface 211 and the second surface 213 may be positioned as the opposite surfaces of the metallic interconnect 210. In some embodiments, the first flow field 212 is an anode flow field and the second flow field 214 is a cathode flow field. The manifold 220 may have more than one distinct interconnected channel to separately fluidly interact with the first flow field 212 and the second flow field 214. During inspection of the assembled portion 215, the manifold 220 may be configured to be in fluidic communication with one or both the flow fields 212 and 214.

The intermediate SOFC 201 may include a second plenum (not shown in FIG. 2A) to establish fluidic communication between the manifold 220 and the second flow field 214. In some embodiments, the second plenum may be in a direction perpendicular to the first plenum 218 and to the direction of the electron movement in the intermediate SOFC 201.

In embodiments where the manifold 220 is configured to be in fluidic communication with both the first flow field 212 and the second flow field 214, the fluid flow during inspection or operation of the SOFC 201 may be controlled such that there is only a fluidic connection between the manifold 220 and the first flow field 212 or only a fluidic connection between the manifold 220 and the second flow field 214. Alternatively, there exists one fluidic connection between the manifold 220 and the first flow field 212 and another fluidic connection between the manifold 220 and the second flow field 214. In one example, during operation of an SOFC stack, the anode flow field carries fuel gas and the cathode flow field carries oxidant for electrochemical reactions. For an efficient operation of the SOFC stack, the fuel and oxidant flow fields are separated and sealed to prevent mixing of the fuel and the oxidant. Further, the manifold 220 may have separate and distinct parts to establish distinct fluid communications with the first flow field 212 and the second flow field 214.

As previously noted, in the example embodiment of FIG. 2A, the assembled portion 215 includes only the metallic interconnect 210. In this embodiment, the metallic interconnect 210 may be inspected using the first flow field 212, the second flow field 214, or both the flow fields 212 and 214 of the metallic interconnect 210. During the inspection of the metallic interconnect 210 using both the flow fields 212 and 214, the fluid used in the first flow field 212 may be same as or different from the fluid in the second flow field 214. For example, in an embodiment having an anode flow field as the first flow field 212 and a cathode flow field as the second flow field 214, helium, nitrogen, or operation-specific fluids such as fuel or air may be used in any of the first flow field 212 or the second flow field 214 for inspecting the metallic interconnect 210. Defects in the metallic interconnect 210 may lead to a decrease or decay in the fluid flow in any one or both of the flow fields 212, 214 or any cross-movement of fluids from one flow field 212/214 to another flow field 214/212.

FIG. 2B illustrates a cross-sectional view of another embodiment of an intermediate SOFC 202. An assembled portion 215 of the intermediate SOFC 202 includes a first deposited layer 230 that is deposited on the first flow field 212 of the metallic interconnect 210. In some embodiments, the first flow field 212 is an anode flow field and the first deposited layer 230 includes one or more layers of an anode deposited on the anode flow field. In some embodiments, the first deposited layer 230 is deposited only in the active region 225 covering the first flow field 212 and is not deposited in the non-active region 227, as shown in FIG. 2B. Further, the first deposited layer 230 is also not a part of the end portion 216. Thus, in FIG. 2B, while the active region 225 includes both the metallic interconnect 210 and the first deposited layer 230, the non-active region 227 and the end portion 216 are only formed of the material of the metallic interconnect 210, without including the material of the first deposited layer 230. Alternatively, in some other embodiments, the first deposited layer 230 may be deposited on the first flow field 212 and also on the non-active region 227 of the metallic interconnect 210, as shown in an intermediate SOFC 209 illustrated in FIG. 2I.

Moreover, in embodiments where the anode is the first deposited layer 230, the first deposited layer 230 may be tailored to have a permeability in a determined working range. The permeability of the deposited anode may be measured using the inspection methods described herein. A deviation in the permeability from the determined working range may be considered as a defect in the first deposited layer 230. The measured permeability of the first deposited layer 230 is related to a permeability of a layer that results from the first deposited layer 230 during operation of a resultant manufactured SOFC.

FIG. 2C illustrates a cross-sectional view of yet another embodiment of an intermediate SOFC 203. An assembled portion 215 of the intermediate SOFC 203 includes a second deposited layer 240. In certain embodiments, the second deposited layer 240 is disposed on the first deposited layer 230. Also, the second deposited layer 240 may be deposited such that the second deposited layer 240 covers both the active region 225 and the non-active regions 227. Further, as shown in the example embodiment of FIG. 2C, the end portions 216 may also include a coating of a material of the second deposited layer 240. In certain embodiments, the second deposited layer 240 is an electrolyte. In some further embodiments, the second deposited layer 240 is an electrolyte having yttria stabilized zirconia as a material of the electrolyte. One or more of the first deposited layer 230, the second deposited layer 240, and the metallic interconnect 210 may be inspected for detecting defects in the second deposited layer 240 in the assembled portion 215 of the intermediate SOFC 203 illustrated in FIG. 2C.

In embodiments where the first deposited layer 230 is the anode, and the second deposited layer 240 is the electrolyte, the second deposited layer 240 may be tailored to have a density in a determined working range. Generally, the electrolyte is configured to have a density that is higher than the density of the anode. The second deposited layer 240 having a higher density aids in providing a good seal to the fluid that is in communication with the first flow field 212 during operation of a resultant manufactured SOFC. The permeance of the assembled portion 215 may be measured using the inspection method presented herein. The measured permeance values may be used to deduce the density or permeability of the second deposited layer 240. In certain embodiments, the deduction of permeability or density is completed using values of the previously measured properties, such as a permeance value of the first deposited layer 230.

FIG. 2D illustrates a cross-sectional view of yet another embodiment of an intermediate SOFC 204. Assembled portion 215 of the intermediate SOFC 204 includes a third deposited layer 250 that is disposed on the second deposited layer 240. In some embodiments, the third deposited layer 250 is an optional second electrolyte. Also, in certain embodiments, the second electrolyte includes gadolinium doped ceria or samarium doped ceria. In some embodiments, the third deposited layer 250 includes an yttria stabilized zirconia material with a different microstructure than that present in the second deposited layer 240. In some further embodiments, the third deposited layer 250 includes both an yttria stabilized zirconia with a modified microstructure and gadolinium doped ceria or samarium doped ceria.

The third deposited layer 250 may fully cover the active region 225 and eventually form a physical barrier between the electrolyte layer and a cathode that may be deposited over the second electrolyte. In the example embodiment of FIG. 2D, the third deposited layer 250 is also deposited in the non-active region 227. Further, the third deposited layer 240 is also a part of the end portion 216. Deposition of one or more layers of an electrolyte that includes yttria stabilized zirconia and/or gadolinium or samarium doped ceria may also increase an overall density of the electrolyte layers and may also provide a hermetic seal for the fluid that is in communication with the first flow field 212 during inspection of the intermediate SOFC 204 or operation of the resultant manufactured SOFC. The third deposited layer 250 and/or one or more of the previously deposited layers and the metallic interconnect 210 may be inspected as discussed previously.

FIG. 2E illustrates a cross-sectional view of another embodiment of an intermediate SOFC 205. Assembled portion 215 of the intermediate SOFC 205 includes a fourth deposited layer 260 on the second flow field 214. In some embodiments, the flow field 214 is a cathode flow field and the fourth deposited layer 260 is an optional cathode interconnect. The optional cathode interconnect 260 may decrease any undesired reactions between the metallic interconnect 210 and a cathode that may be in contact with the second flow field 214. Such undesired reactions include chromium volatilization from the metallic interconnect 210 during operation and subsequent cathode poisoning that may reduce or degrade the operating voltage of the SOFC 205. Typical materials that may be used to form the fourth deposited layer 260 include, but are not limited to, manganese, cobalt, iron, chromium, or combinations thereof. Examples of the material of the fourth deposited layer 260 may also include oxides of one or more of manganese, cobalt, iron, and chromium. In the embodiment shown in FIG. 2E, the cathode interconnect is deposited only in the active region 225, covering the cathode flow field 214. The cathode interconnect is not deposited on the non-active region 227. Inspection of the fourth deposited layer 260 may be conducted by passing a fluid in the second flow field 214.

FIG. 2F illustrates a cross-sectional view of yet another embodiment of an intermediate SOFC 206. Assembled portion 215 of the intermediate SOFC 206 includes a fifth deposited layer 270 that is deposited/disposed on the third deposited layer 250 if the third deposited layer 250 is present. In other embodiments, the fifth deposited layer 270 may be disposed on the second deposited layer 240. The fifth deposited layer 270 may include one or more layers of a cathode. Cathode materials may include, but are not limited to, perovskite materials containing lanthanum, strontium, cobalt, iron, manganese, or combinations thereof. The cathode layer may also include an ionic conductor such as yttria-stabilized zirconia or gadolinium doped ceria. In some embodiments, the cathode is deposited only in the active region 225 over the electrolyte. Thus, in the embodiment shown in FIG. 2E, the fifth deposited layer 270 is not deposited on the non-active region 227. Also, the fifth deposited layer 270 is not deposited on the end portion 216.

FIG. 2G illustrates a cross-sectional view of another embodiment of an intermediate SOFC 207. Assembled portion 215 of the intermediate SOFC 207 illustrates an optional, sixth deposited layer 280 that is disposed on the non-active regions 227 of metallic interconnect 210 on the side of the cathode flow field 214. In the embodiment shown in FIG. 2G, the sixth deposited layer 280 is also deposited to on the end portion 216. In some embodiments, the sixth deposited layer 280 is a barrier layer that is configured to limit or prohibit an undesired interaction of the metallic interconnect 210 with a glass layer that may be otherwise deposited over the non-active regions 227 of the metallic interconnect 210. Materials used to form the barrier layer 280 may include, but are not limited to, aluminum oxide, yttria-stabilized zirconia, aluminum phosphate material, or combinations thereof.

FIG. 2H illustrates a cross-sectional view of yet another embodiment of an intermediate SOFC 208. Assembled portion 215 of the intermediate SOFC 208 includes a seventh deposited layer 290 that is disposed over the optional sixth deposited layer 280 if the sixth deposited layer 280 is present. Alternatively, the seventh deposited layer 290 may be disposed on the non-active regions 227 of the metallic interconnect 210. In some embodiments, the seventh deposited layer 290 is a glass layer that is configured to seal the metallic interconnect 210 with the electrolyte of an adjacent SOFC during stacking. The glass layer is configured to prevent the leakage of the fluid from the SOFC stack during operation and also to prevent mixing of two or more fluids that may be present at different parts of the manifold 220.

Figure 2I:
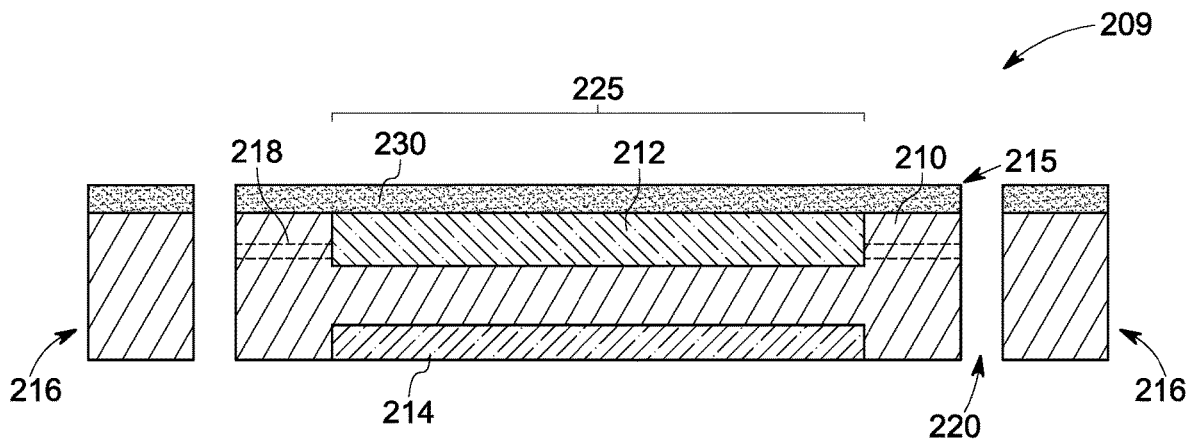
FIG. 2I is a cross-sectional diagram of an alternative embodiment of the intermediate SOFC of FIG. 2B, where the intermediate SOFC includes a metallic interconnect and a first deposited layer as an assembled portion, in accordance with some embodiments of the present specification.

Intermediate SOFC 209 of FIG. 2I is an alternative embodiment of the intermediate SOFC 202 of FIG. 2B. The intermediate SOFC 209 illustrates one of the alternative configurations of the first deposited layer 230 that is amenable for building the SOFC and inspecting the assembled portion 215 of the intermediate SOFC 209 using the methods described herein. In the example embodiment of FIG. 2I, the first deposited layer 230 is also deposited in the non-active region 227 and over the end portion 216. In the embodiment of FIG. 2I, the assembled portion 215 including the first deposited layer 230 may be inspected for defects in the intermediate SOFC 209. In certain embodiments, both the first deposited layer 230 and the metallic interconnect 210 of the assembled portion 215 may be inspected for detecting defects in the first deposited layer 230.

Figure 3:
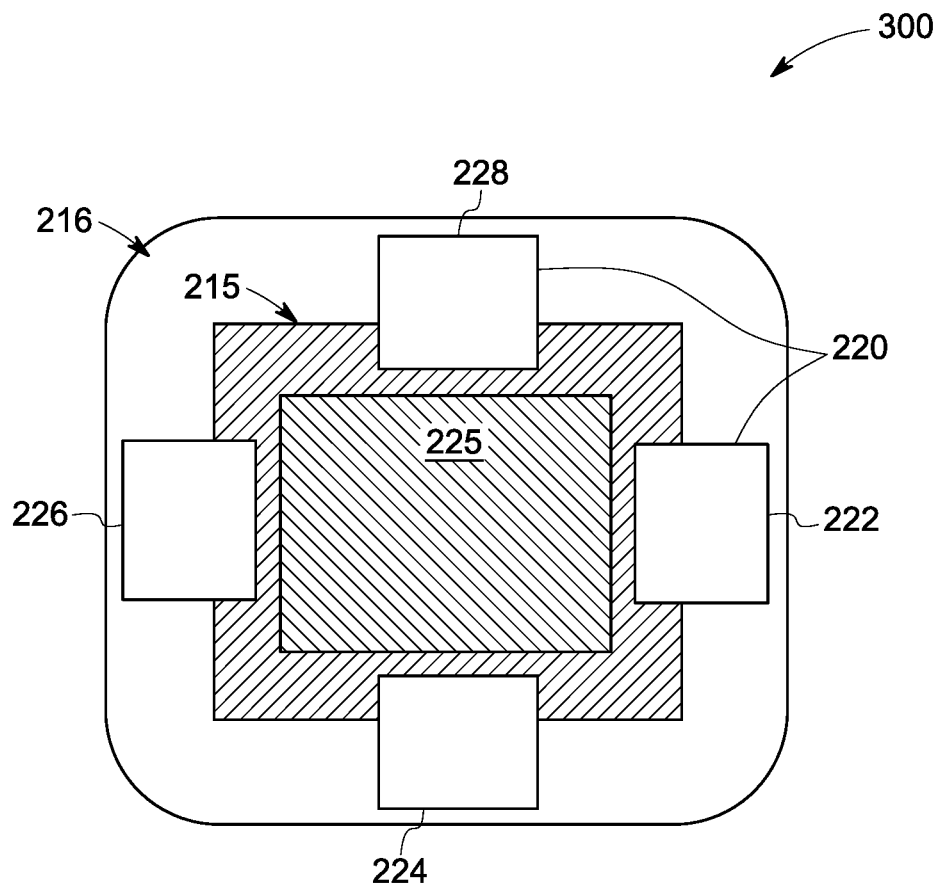
FIG. 3 is a top view of a representative SOFC of FIGS. 2A-2I, in accordance with some embodiments of the present specification.

FIG. 3 provides a top view of an intermediate SOFC 300 represented in the cross-sectional view of any of the SOFCs of FIGS. 2A-2I. In FIG. 3, the SOFC 300 includes the assembled portion 215, the end portion 216, and the manifold 220. The manifold 220 has four distinct parts 222, 224, 226, and 228 that are built to supply fluid to the assembled portion 215 during inspection and operation. The manifold parts 222 and 226 are present on opposite sides of the assembled portion 215 and are connected to the first flow field 212 (not shown in FIG. 3). Also, the manifold part 222 may be configured as an inlet side of the manifold 220 to the first flow field 212 and the manifold part 226 may be configured as an outlet side of the manifold 220 to the first flow field 212. Furthermore, in this embodiment, the manifold parts 224 and 228 are present on two other opposite sides of the assembled portion 215 of the SOFC 300 and are connected to the second flow field 214 (not shown in FIG. 3). In some other embodiments, manifold parts 224 and 228 are present on the same sides of the assembled portion 215 of the SOFC 300 and the second flow field 214 is parallel to the first flow field 212. In one example, the manifold parts 222, 226 may be the parts of the manifold 220 that are connected to the anode flow field 212, and manifold parts 224, 228 may be the parts of the manifold 220 that are connected to the cathode flow field 214. This arrangement of the parts of the manifold 222, 226 allows the fuel to be in communication with the manifold 220 and the anode flow field 212. Similarly, the arrangement of the manifold parts 224, 228 allows the oxidant to be in communication with the manifold 220 and the cathode flow field 214.

In accordance with aspects of the present specification, a method for inspecting an assembled portion of the SOFC includes applying a pneumatic constraint to a fluid that is in fluidic communication with the assembled portion. The fluid may be supplied to the assembled portion using the manifold. Applying a pneumatic constraint to the fluid that is in fluidic communication with the assembled portion includes maintaining the fluid at a pressure that is higher than an ambient pressure. In some embodiments, the fluid may also be maintained at a lower pressure than an ambient pressure, including maintaining the fluid under vacuum. Further, applying a pneumatic constraint to the fluid that is in fluidic communication with the assembled portion includes flowing the fluid at a constant flow rate to be in communication with the assembled portion of the SOFC. Controlling the fluid to hold the fluid at a pressure or to pass the fluid at a constant flow rate may require a seal at one or more points in the manifold. Accordingly, in some embodiments, the manifold is coupled to an external seal to regulate the fluidic communication with the assembled portion of the SOFC.

Figure 4:
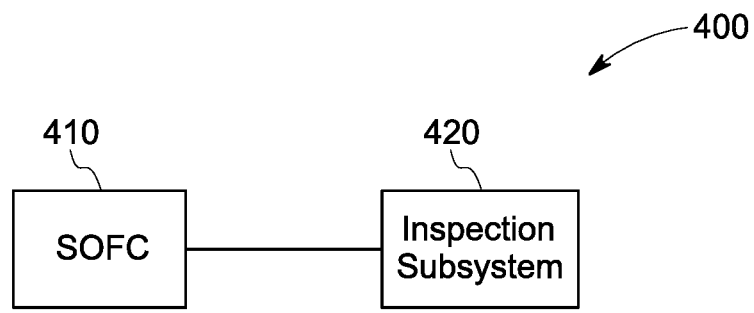
FIG. 4 is a schematic of a system for inspecting an assembled portion of an SOFC, in accordance with some embodiments of the present specification.

FIG. 4 is a schematic of a system 400 that may be used for inspecting assembled portions of an SOFC 410 using an inspection subsystem 420. Specifically, the system 400 includes the inspection subsystem 420 that is communicatively coupled to the SOFC 410. The SOFC 410 includes both the assembled portion 215 and the end portion 216 denoted in any of the intermediate SOFCs presented in FIGS. 2A-2I. The inspection subsystem 420 may include a fluid, structural enhancements to the SOFC 410, additional parts, measurement probes or equipment that may be utilized along with SOFC 410 to inspect the SOFC 410.

Figure 5:
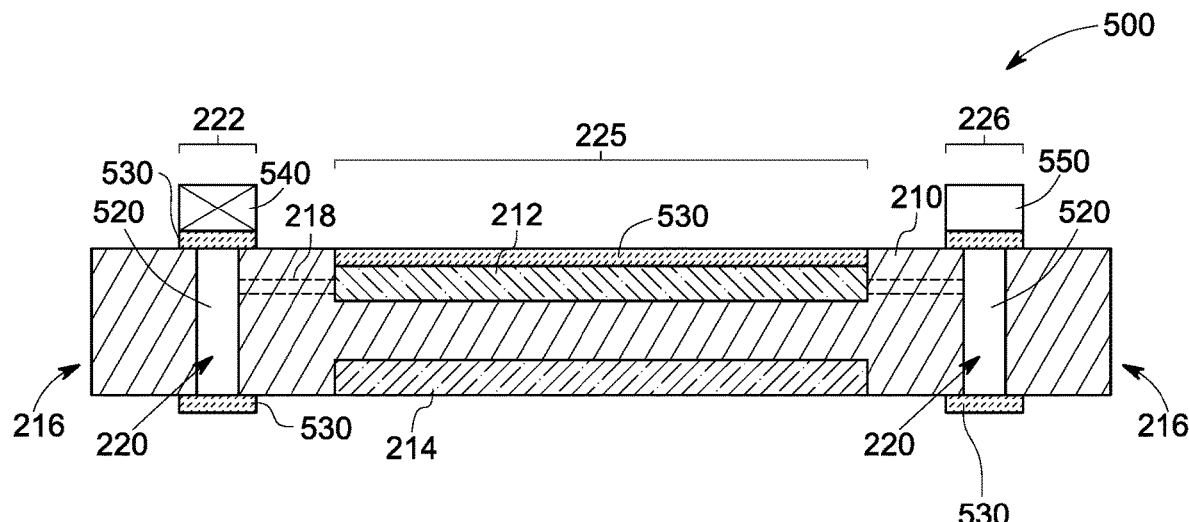
FIG. 5 is a cross-sectional view of a system for inspecting an assembled portion of the intermediate SOFC of FIG. 2A, in accordance with some embodiments of the present specification.

FIG. 5 is a cross-sectional view of a system 500 for inspecting the assembled portion 215 of the intermediate SOFC 201 illustrated in FIG. 2A. The system 500 is configured to inspect the intermediate SOFC 201 via use of an inspection subsystem. By way of example, additional parts, fluid, and equipment denoted in FIG. 5 are components of the inspection subsystem. As previously noted, in the embodiment of FIG. 2A, the assembled portion of the SOFC 201 is the metallic interconnect 210. Inspecting the metallic interconnect 210 entails inspecting the structural integrity of the flow field portion in the active region 225 or any other portions of the metallic interconnect 210, such as, for example, a base portion in between the first flow field 212 and the second flow field 214. The intermediate SOFC 201 also includes the end portion 216 and the manifold 220. In the embodiment of FIG. 5, apart from the intermediate SOFC 201, the system 500 includes a seal 530 to regulate the fluidic communication between the metallic interconnect 210 and the manifold 220. The seal 530 is a part of an inspection subsystem that is used to inspect the intermediate SOFC 201. Also, the seal 530 is applied to both surfaces of the metallic interconnect 210 at both the inlet side manifold part 222 and the outlet side manifold part 226 of the manifold 220. The seal 530 is also applied over the first flow field 212 in the active region 225 of the metallic interconnect 210 to prevent fluid flow to the ambience from the first flow field 212 in the active region 225.

In FIG. 5, the seal 530 is generally indicated at the end points of the manifold 220 and also on the first flow field 212. However, it may be appreciated that the seal applied over the first flow field 212 may or may not be of the same material as the seal that is applied to the end points of the manifold 220. In some embodiments, a gasket is used as the seal 530 in the end points of the manifold 220. The gasket is applied over the manifold parts 222 and 226 and around the active region 225. In these embodiments, the seal 530 over the first flow field 212 may be different from the gasket. In the example embodiment of FIG. 5, the seal 530 applied over the first flow field 212 is a coating applied over the flow field 212. In certain embodiments, the coating may be thermally sprayed on the flow field 212 and may include an electrode material, an electrolyte material, or a combination thereof.

A fluid 520 is supplied to the metallic interconnect 210 via the manifold 220. The fluid 520 is a part of the inspection subsystem. The fluid 520 may be stored in a tank (not shown in FIG. 5) and supplied to the metallic interconnect 210 of the intermediate SOFC 201 through a pump (not shown in FIG. 5). Also, the fluid 520 is in communication with the first flow field 212 through the plenum 218. For inspecting the assembled portion 215, a pneumatic constraint is applied to the fluid 520. Applying the pneumatic constraint to the fluid 520 of any of the systems illustrated in FIGS. 5, 7, 9, and 11 may include maintaining the fluid 520 in communication with the assembled portion 215 at a pressure that is higher than or lower than an ambient pressure. The fluid 520 may be maintained at a high pressure using a pressure applying equipment 540 such as a pump. In certain embodiments, a value of the applied pressure may be maintained at a constant value. In certain embodiments, if there is a defect in the metallic interconnect 210 and the leak occurs due to the defect, even though a constant pressure is applied to the fluid initially, the pressure of the fluid in communication with the assembled portion 215 may decrease over time as a consequence of the leak. In such embodiments, even if the applied pressure value is not at a constant value, the pressure on the fluid is sustained at a higher value than the ambient pressure value. In some embodiments, the pressure of the fluid 520 in communication with the assembled portion 215 may be varied while constraining the fluid 520, still keeping the value of the pressure higher than the ambient pressure.

One or more quality control parameters of the metallic interconnect 210 are measured while a pneumatic constraint is applied to the fluid 520. In some embodiments, two or more quality control parameters may be measured while a single pneumatic constraint is applied to the fluid 520. Determining the quality control parameters while maintaining the fluid at a pressure that is higher than the ambient pressure includes determining one or more of a leak rate, a spatial pressure drop, or a permeability of one or more layers of the assembled portion 215. The spatial pressure drop may be measured at any point across the assembled portion 215. Quality control parameters may be measured using a pressure sensor equipment 550 such as a pressure transducer or a manometer. The pressure sensor equipment 550 is disposed in communication with the assembled portion 215 under inspection and may be moved around. In certain embodiments, the pressure sensor equipment 550 is disposed at the outlet side manifold part 226. The pressure applying equipment 540 and pressure sensor equipment 550 are part of the inspection subsystem that is used to inspect the SOFC 410.

In certain embodiments, the system 500 may be used to detect a fluid leak in the assembled portion 215. Additionally, the leak rate of the metallic interconnect 210 may be measured while maintaining the fluid in communication with the metallic interconnect 210 at the pressure higher than the ambient pressure. The leak rate may be measured using the pressure sensor equipment 550. Permeability of the metallic interconnect 210 may also be determined while the fluid 520 is maintained at a higher pressure than the ambient pressure.

Further, a spatial pressure drop in the fluid 520, if any, across the metallic interconnect 210 may be measured while maintaining the fluid in communication with the assembled portion 215 at a pressure that is higher than the ambient pressure. The spatial pressure drop may be measured starting from the inlet side manifold part 222 up to the outlet side manifold part 226. Applying the pressure and measuring the leak rate, permeability, spatial pressure drop, or combinations thereof may be carried out repeatedly to identify and evaluate any errors in the measurements. Further, the applied pressure values may be varied from one measurement to another measurement. By way of example, the leak rates corresponding to the constant applied pressures at various pressure values may be measured and the leak rates corresponding to the various independent measurements may be compared to check the accuracy of the measurements. The measurements corresponding to the metallic interconnect 210 based on the first flow field 212 as described hereinabove may also be performed using the cathode flow field 214 of the metallic interconnect 210 and the corresponding manifold parts 224 and 228.

Figure 6:
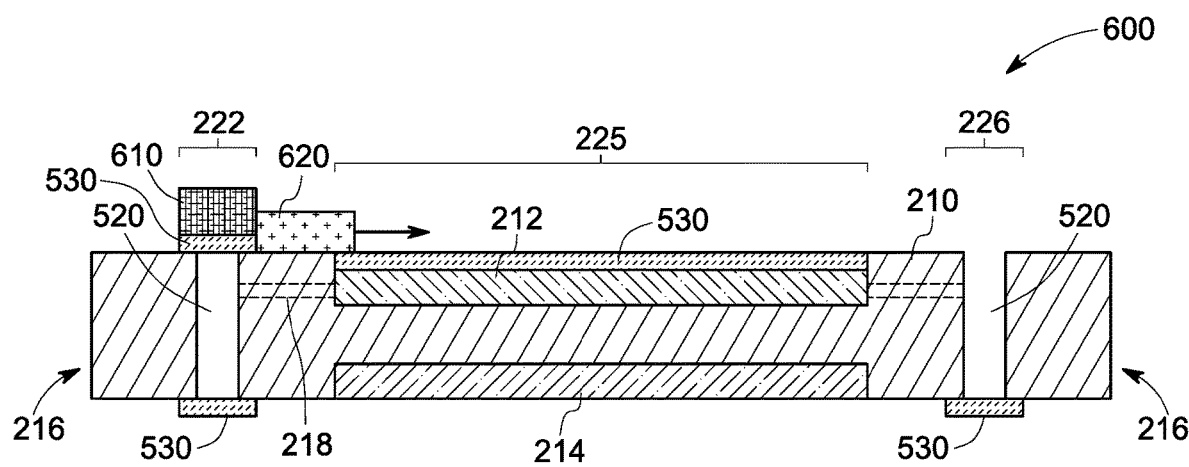
FIG. 6 is a cross-sectional view of another system for inspecting the assembled portion of the intermediate SOFC of FIG. 2A, in accordance with some embodiments of the present specification.

FIG. 6 is a cross-sectional view of a system 600 that may be used in another method for inspecting the assembled portion 215 of the intermediate SOFC 201 presented in FIG. 2A. In this method, the seal 530 is applied to both surfaces of the metallic interconnect 210 at the inlet side manifold part 222 of the manifold 220. The seal 530 is also applied over the first flow field 212 in the active region 225 of the metallic interconnect 210 as previously discussed with respect to FIG. 5. In the embodiment of FIG. 6, no seal is applied to one surface of the metallic interconnect 210 at the outlet side manifold part 226 of the manifold 220 so that one end of the outlet side manifold part 226 is open to the ambient.

The fluid 520 is supplied to the manifold 220 such that the fluid 520 is in communication with the metallic interconnect 210. Also, the supplied fluid 520 is in communication with the first flow field 212 through the plenum 218. Further, the fluid 520 is supplied to the assembled portion 215 at a constant flow rate from the inlet side manifold part 222, using a pressure pump 610. The flow rate of the fluid 520 may be measured using a flow meter (not shown in FIG. 6). When the fluid 520 is supplied at a constant flow rate, determining the quality control parameter entails determining a spatial pressure drop of the fluid 520 in the assembled portion 215. The spatial pressure drop corresponding to the assembled portion 215 may be measured using a pressure sensor 620. Also, the spatial pressure drop may be measured at different points of the assembled portion 215 in between the inlet side manifold part 222 and the outlet side manifold part 226.

The measured spatial pressure drop may be used as a quality control parameter in inspecting the metallic interconnect 210. For example, in this set up, in the absence of any defects in the metallic interconnect 210, the pressure of the fluid 520 at a given time is expected to be spatially constant from the inlet side manifold part 222 to the outlet side manifold part 226, without giving rise to any spatial pressure drop. Repeated measurements with the same flow rate and measurements with different flow rates may be carried out for ascertaining the health of the assembled portion 215. The measurements as described hereinabove may also be conducted using the cathode flow field 214 of the metallic interconnect 210 using the manifold parts 224 and 228. In some embodiments, the system 500 may be transitioned to form the system 600 and quality control parameters may be sequentially measured. For example, after performing the measurements using the system 500, one of the seals may be vented to form the system 600 and the measurements of the quality control parameters may be sequentially carried out.

In some embodiments, the assembled portion 215 of the SOFC 201 includes an electrode and/or electrolyte in addition to the metallic interconnect 210. In certain embodiments, the electrode is in contact with the flow field 212 of the assembled portion 215 of the SOFC 201. In accordance with aspects of the present specification, the electrode and/or electrolyte along with the metallic interconnect 210 may be inspected. FIGS. 7-12 illustrate various systems that may be used to inspect the intermediate SOFCs having one or more electrodes and/or one or more electrolytes.

Figure 7:
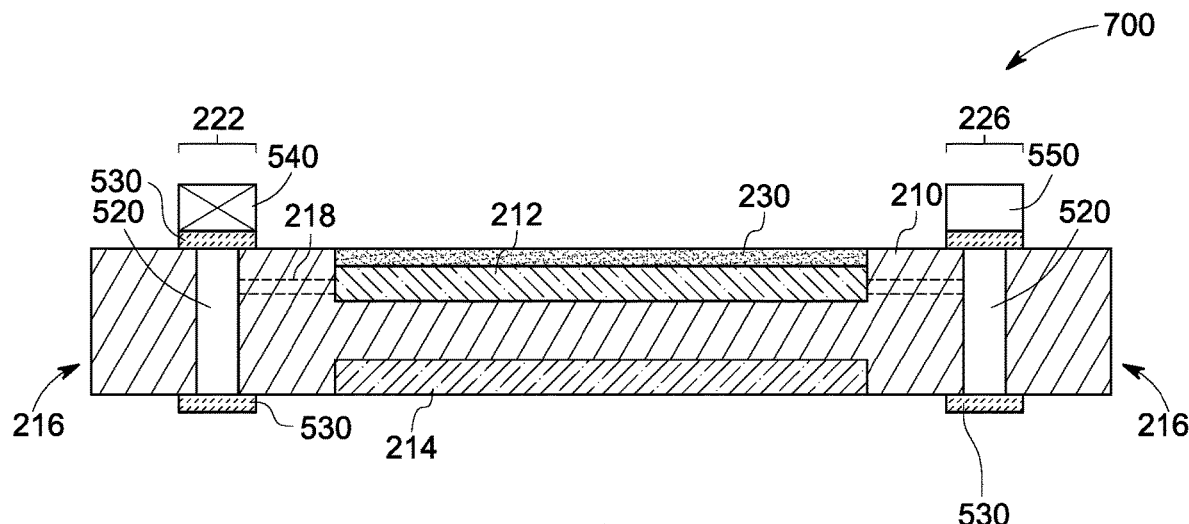
FIG. 7 is a cross-sectional view of a system for inspecting an assembled portion of the intermediate SOFC of FIG. 2B, in accordance with some embodiments of the present specification.
Figure 8:
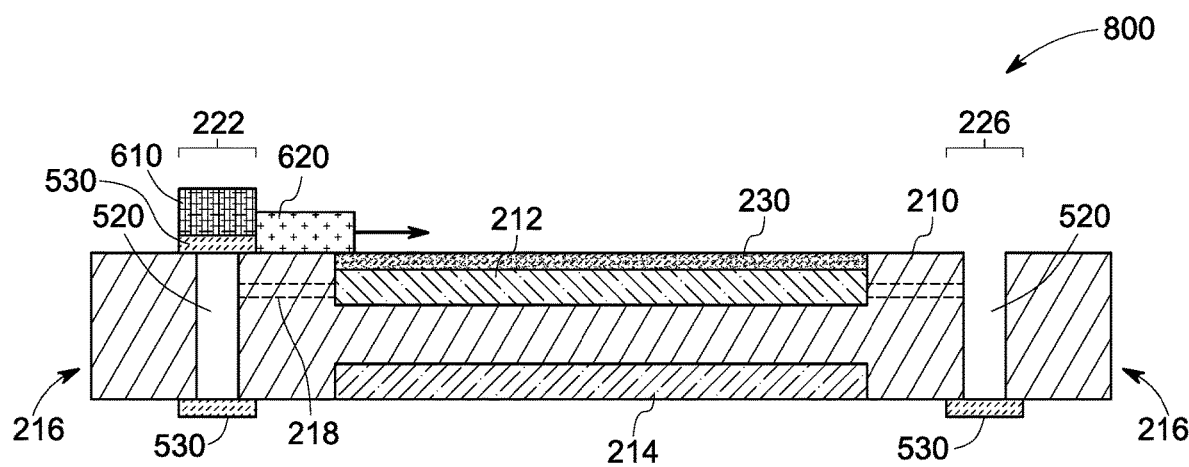
FIG. 8 is a cross-sectional view of another system for inspecting the assembled portion of the intermediate SOFC of FIG. 2B, in accordance with some embodiments of the present specification.
Figure 9:
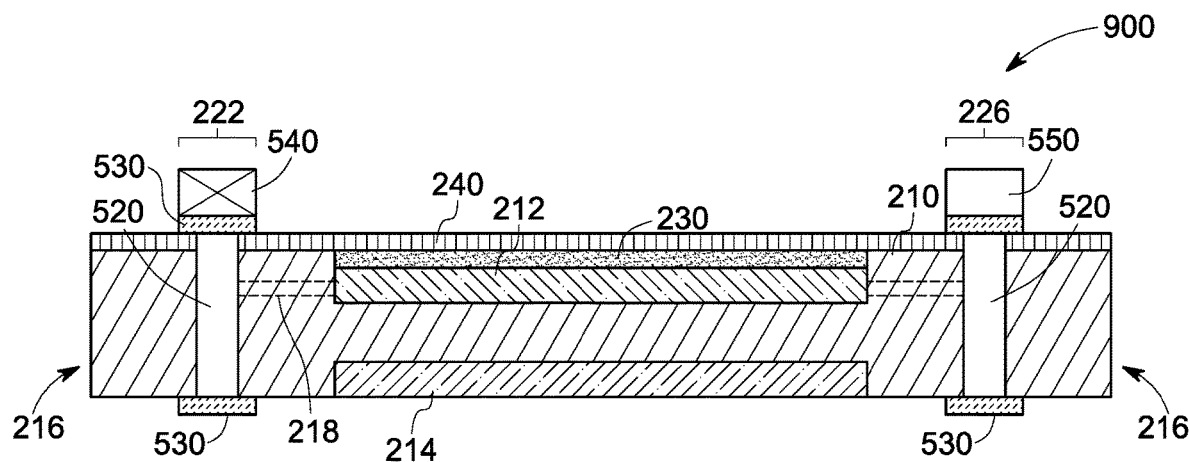
FIG. 9 is a cross-sectional view of a system for inspecting an assembled portion of the intermediate SOFC of FIG. 2C, in accordance with some embodiments of the present specification.
Figure 10:
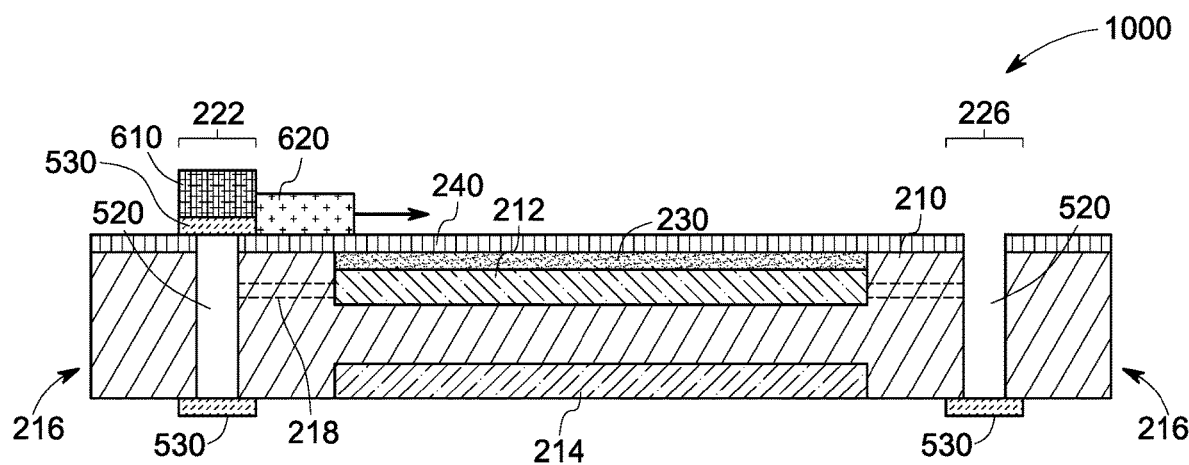
FIG. 10 is a cross-sectional view of another system for inspecting the assembled portion of the intermediate SOFC of FIG. 2C, in accordance with some embodiments of the present specification.
Figure 11:
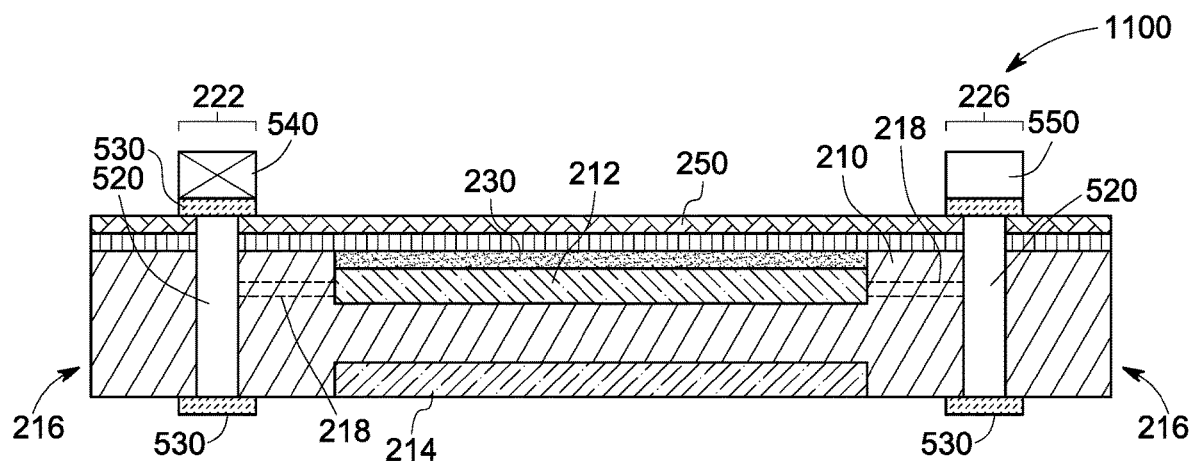
FIG. 11 is a cross-sectional view of a system for inspecting an assembled portion of the intermediate SOFC of FIG. 2D, in accordance with some embodiments of the present specification.
Figure 12:
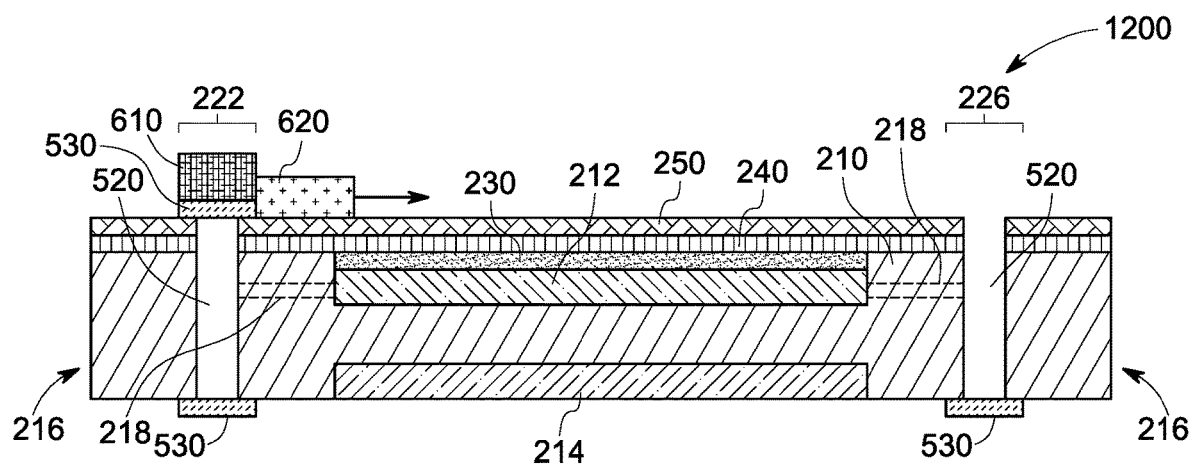
FIG. 12 is a cross-sectional view of another system for inspecting the assembled portion of the intermediate SOFC of FIG. 2D, in accordance with some embodiments of the present specification.

FIGS. 7, 9, and 11 include maintaining the fluid 520 in communication with the assembled portion 215 at a higher or lower pressure than the ambient pressure as previously described with respect to FIG. 5, and the FIGS. 8, 10, and 12 include supplying the fluid 520 to the assembled portion 215 at a constant flow rate. The leak, leak rate, permeance, or spatial pressure drop of the assembled portion 215 may be determined using the systems presented in FIGS. 5, 7, 9, and 11. The systems of FIGS. 6, 8, 10, and 12 entail measuring the spatial pressure drop across the assembled portion 215. A spatial pressure drop across any part of the assembled portion 215 may indicate a defect in that part of the assembled portion 215. Moreover, measurement of the spatial pressure drop enables identification of the defect location and an extent of the defect in the assembled portion 215.

FIG. 7 is a cross-sectional view of a system 700 that may be used to inspect the assembled portion 215 of the intermediate SOFC 202 presented in FIG. 2B. The first deposited layer 230 may be inspected using the system 700 of FIG. 7. Inspection of the first deposited layer 230 entails applying a pneumatic constraint to the fluid 520 and determining one or more quality control parameters of a combination of the first deposited layer 230 and the metallic interconnect 210. In certain embodiments, the first deposited layer 230 is an anode. The seal 530 is applied to both surfaces of the metallic interconnect 210 at the inlet side manifold part 222 and the outlet side manifold part 226 of the manifold 220. For measuring a permeability of the first deposited layer 230, a seal is not applied on the first deposited layer 230 in the active region 225 of the assembled portion 215.

The fluid 520 is supplied to the manifold 220 and is configured to be in communication with the first flow field 212 of the metallic interconnect 210. The fluid 520 is in contact with the first deposited layer 230 through the first flow field 212 of the metallic interconnect 210. Moreover, the supplied fluid 520 is pressurized to a value that is higher than the ambient pressure. Subsequently, a fluid leak, permeability, spatial pressure drop, or combinations thereof may be detected and measured using the system 700. The measured leak rate, permeability, or spatial pressure drop of a combination of the first deposited layer 230 and the metallic interconnect 210 may be used as one or more quality control parameters in inspecting the first deposited layer 230. In some embodiments, the quality control parameters obtained from the measurement corresponding to the metallic interconnect 210 alone performed using the system 500 may be deducted from the respective quality control parameters obtained from the measurement conducted using the system 700 to determine the quality control parameter corresponding to the first deposited layer 230. Repeated measurements may be carried out to validate the measured values. Further the applied pressure may be varied from one measurement to another measurement and the quality control parameters such as leak rates at various pressure values may be obtained to facilitate accurate measurement of the quality control parameters related to the first deposited layer 230.

FIG. 8 is a cross-sectional view of a system 800 that may be used in another method for inspecting the assembled portion 215 of the intermediate SOFC 202 presented in FIG. 2B. Similar to the method used for inspecting the metallic interconnect 210 of FIG. 6, in the method for inspecting the first deposited layer 230 of FIG. 8, a seal 530 is applied to both surfaces of the metallic interconnect 210 at the inlet side manifold part 222 of the manifold 220. No seal is applied to one surface of the metallic interconnect 210 at the outlet side manifold part 226 of the manifold 220. Hence, one end of the outlet side manifold part 226 is open to the ambience.

The fluid 520 is supplied to the manifold 220 and is in communication with the first deposited layer 230 through the flow field 212 of the metallic interconnect 210. The fluid 520 is supplied at a constant flow rate from the inlet side manifold part 222. During the constant flow rate supply of the fluid 520, a spatial pressure drop is measured across the assembled portion 215. The spatial pressure drop may be measured at different points on the assembled portion 215 in between the inlet side manifold part 222 and the outlet side manifold part 226. The measured pressure drop may be used as a quality control parameter in inspecting the first deposited layer 230 of the assembled portion 215. Repeated measurements with the same flow rate and measurements with different flow rates may be obtained for ascertaining the health of the assembled portion 215.

FIG. 9 is a cross-sectional view of a system 900 that may be used for a method for inspecting the assembled portion 215 of the intermediate SOFC 203 presented in FIG. 2C. The system 900 may be used to inspect the second deposited layer 240. As noted previously, the assembled portion 215 of the SOFC 203 includes the first deposited layer 230 that is in contact with the first flow field 212. Also, the electrolyte is disposed on the electrode to seal the flow field 212 of the metallic interconnect 210. In one embodiment, the first deposited layer 230 is an anode and the second deposited layer 240 is the electrolyte. The seal 530 is applied to both ends of the inlet side manifold part 222 and outlet side manifold part 226 of the manifold 220. No seal is applied on the second deposited layer 240 in the active area 225.

The fluid 520 is supplied to the manifold 220 and is in communication with the first flow field 212 of the metallic interconnect 210. The fluid 520 is in communication with the second deposited layer 240 through the first flow field 212 and the first deposited layer 230. The supplied fluid 520 is pressurized to a value that is higher than the ambient pressure and a fluid leak, permeability, spatial pressure drop, or combinations thereof may be detected and measured using the system 900. The measured leak rate, permeability, or spatial pressure drop may be used as one or more quality control parameters for inspecting the second deposited layer 240 or a combination of the first deposited layer 230 and the second deposited layer 240.

As noted previously, various layers of the SOFC are configured to perform corresponding defined functions. The material and microstructure of the layers may be tuned to suit the performance of the various layers of the SOFC. For example, an anode layer may be disposed such that its construction aids in achieving a desired interaction with the supplied fuel. An electrolyte layer may be tuned for facilitating transport of the ions. An additional electrolyte may aid in the ionic transport and also decrease the fuel leak to the atmosphere. To cater to the inspection of these varied layers of the assembled portion, a set of desired ranges for the pneumatic constraints to be applied to the fluid and a set of desired ranges for the quality control parameters may be determined prior to the inspection of the assembled portion of the SOFC. Comparison of the measured quality control parameters with the pre-determined quality control parameters of that assembled portion may be used to ascertain the health of the assembled portion.

In some embodiments, where the assembled portion 215 includes the anode as the first deposited layer 230 and the electrolyte as the second deposited layer 240, a variation in the measured quality control parameter may be desired in comparison to the same measured quality control parameter corresponding to the assembled portion having the first deposited layer 230, without the presence of the second deposited layer 240. For example, a variation in the quality control parameter may be desired when the intermediate SOFC 203 is inspected as compared to the inspection of the intermediate SOFC 202. The variation in the measured quality control parameter may be a desired improvement in the quality control parameter. The desired improvement in the quality control parameter may be include a decrease in the leak rate, a decrease in the permeability, a decrease in spatial pressure drop, or any combinations thereof. In some embodiments, where the quality control parameter is a leak rate, the leak rate measured for the intermediate SOFC 203 is 2 and 20 times less from the leak rate measured for the intermediate SOFC 202. That is, the leak rate measured for the intermediate SOFC 202 using the system 700 is 2-20 times higher than the leak rate measured for the intermediate SOFC 203 using the system 900. The decrease in the leak rate in the intermediate SOFC 203 compared to the leak rate in the intermediate SOFC 202 is attributed to the increased density of the second deposited layer 240 compared to the density of the first deposited layer 230.

FIG. 10 is a cross-sectional view of a system 1000 that may be used for measuring a spatial pressure drop in the assembled portion 215 of the intermediate SOFC 203 presented in FIG. 2C. In the system 1000, a seal 530 is applied over the second deposited layer 240 on one side and on the metallic interconnect 210 on the other side, thereby covering the inlet side manifold part 222. The seal 530 is also applied over the second deposited layer 240 at the outlet side manifold part 226. No seal is applied over the metallic interconnect 210 at the outlet side manifold part 226 of the manifold 220. Hence, one end of the outlet side manifold part 226 is open to the ambience.

The fluid 520 is supplied to the manifold 220 and is in communication with the flow field 212 of the metallic interconnect 210. The fluid 520 is also in communication with the second deposited layer 240 through the first flow field 212. The fluid 520 is supplied to the assembled portion 215 at a constant flow rate from the inlet side manifold part 222. During the constant flow rate supply of the fluid 520, a spatial pressure drop is measured across the assembled portion 215. The spatial pressure drop may be measured at different points of the assembled portion 215 in between the inlet side manifold part 222 and the outlet side manifold part 226. The measured pressure drop may be used as a quality control parameter for inspecting the assembled portion 215.

The systems 1100 and 1200 illustrated in FIG. 11 and FIG. 12 respectively, may be used for inspecting the intermediate SOFC 204 illustrated in FIG. 2D. The intermediate SOFC 204 includes the third deposited layer 250. In some embodiments, the third deposited layer 250 is the optional additional electrolyte deposited over the electrolyte layer. A seal 530 is applied over the third deposited layer 250 at the ends of the manifold inlet part 222 and outlet part 226, as shown in FIG. 11 and FIG. 12. The seal 530 is also applied over the metallic interconnect 210 to cover the inlet side 222 and the outlet side 226, as depicted in FIG. 11. In FIG. 12, the seal 530 is applied to the metallic interconnect 210 at the end part of the manifold 220 to the inlet side 222, but the fluid flow at the outlet side 226 of the manifold 220 is not restricted with a seal. Leak rate, electrolyte coating permeability, pressure drop, or any combinations thereof may be measured using the systems 1100 and 1200.

In some embodiments, the second deposited layer 240 has the electrolyte that includes yttria stabilized zirconia material, and the third deposited layer 250 has the additional electrolyte including gadolinium and/or samarium doped ceria material. In these embodiments, it is desirable that the additional electrolyte layer 250 has a higher density than the density of the combination of the anode and the electrolyte layers. Therefore, a decrease in the leak rate of the intermediate SOFC 204 when measured using the system 1100 is expected as compared to the measured leak rate of the intermediate SOFC 203 inspected using the system 900. In some embodiments, the leak rate measured for the intermediate SOFC 204 is 10 and 800 times less from the leak rate measured for the intermediate SOFC 203. That is, the leak rate measured for the intermediate SOFC 203 using the system 900 is 10-800 times higher than the leak rate measured for the intermediate SOFC 204 using the system 1100.

Similar measurements as previously described with respect FIGS. 7-12 may also be obtained during sequential deposition of layers starting from the deposition of the cathode on the second flow field 214 of the metallic interconnect 210. For example, the sequential deposition of various layers may start from the deposition of a cathode interconnect layer on the second flow field 214 in the active region 225, followed by cathode deposition, barrier layer deposition, glass layer deposition, additional electrolyte and electrolyte deposition, and anode deposition. The various assembled layers may be inspected using correspondingly built systems.

In some embodiments, a fuel that is normally used for the operation of the SOFC stack may be used as the fluid 520 for testing the assembled portions that include the first flow field 212 as the anode flow field. For example, any leakage of the fuel during operation of the SOFC stack may be accurately measured by using the same fuel as the fluid 520 during inspection. Using the same fuel as the fluid during the inspection circumvents any variations in the measured parameters due to variations in the properties of the fluid used for inspecting the SOFC. In some embodiments, air may be used as the fluid 520 while testing the assembled portion 215 using the cathode flow field 214. Moreover, in certain embodiments, the metallic interconnect 210 having both the first flow field 212 and the second flow field 214 may be simultaneously inspected using fuel as the fluid that is in communication with the first flow field 212 and air as the fluid that is in communication with the second flow field 214.

In some embodiments, the method of inspecting is repeatedly used for inspecting one or more layers of an SOFC during the manufacturing of the SOFC. Repeatedly using the method includes applying a pneumatic constraint to a fluid, determining a quality control parameter of the assembled portion of the SOFC in response to the pneumatic constraint, and ascertaining the health of the assembled portion of the SOFC based on the quality control parameter. While the pneumatic constraint is applied to the fluid, the fluid is in communication with one or more layers of the SOFC. The assembled portion of the SOFC includes a metallic interconnect that has a flow field. The SOFC includes a manifold in fluidic communication with the assembled portion of the SOFC. A seal may be coupled to the manifold to regulate the fluidic communication. In some embodiments, repeatedly inspecting one or more layers of the assembled portion includes inspecting the one or more layers of the assembled portion multiple times. In some other embodiments, repeatedly inspecting one or more layers includes inspecting sequentially built assembled portions of the SOFC during manufacturing of the SOFC. Furthermore, in certain embodiments, applying the pneumatic constraint includes maintaining the fluid in communication with the assembled portion at a pressure that is higher than an ambient pressure, flowing the fluid in communication with the assembled portion of the SOFC in a constant flow rate, or a combination thereof. Determining the quality control parameter may include determining a leak rate of the fluid, determining a spatial pressure drop of the fluid, determining a permeability, or combinations thereof.

Systems and methods described hereinabove provide enhanced quality control of the metallic interconnect-supported, sequentially manufactured SOFC in comparison to quality control of SOFCs that are traditionally manufactured using sintering techniques. More specifically, in the SOFCs that have metallic interconnects having one or more flow fields and an integrated manifold in the individual SOFC unit, pneumatic testing is used at specific parts of the sequential manufacturing process to identify process-specific defects. For instance, coatings using thermal spray deposition have historically been challenged to provide sufficiently hermetic and reproducible electrolyte coatings for commercial viability. A metallic interconnect-supported and sequentially manufactured SOFC where the individual manufactured SOFC is produced using a series of sequential manufacturing steps allows for pneumatic testing at multiple points in the manufacturing process to monitor the health of flow field design, coatings, ceramic seals, and metallurgical seals. Such pneumatic testing results in a rapid quality control method at reduced manufacturing cost.

This written description uses some examples to disclose the claimed disclosure, including the best mode, to enable any person skilled in the art to practice the disclosure, including making and using any devices or systems and performing any incorporated methods. The scope of the claimed disclosure may include other examples that occur to those skilled in the art. Such other examples are intended to be within the scope of the appended claims if they have structural elements that do not differ from the literal language of the claims, or if they include equivalent structural elements with insubstantial differences from the literal language of the claims.

The invention claimed is:

1. A method for inspecting an assembled portion of an individual solid oxide fuel cell (SOFC) unit, the method comprising:
applying a pneumatic constraint that does not comprise a vacuum to a fluid that is in communication with the assembled portion of the SOFC,
wherein the assembled portion of the individual SOFC unit comprises a metallic interconnect comprising a flow field and
wherein the individual SOFC unit is a single unit of a SOFC prior to stacking of multiple individual SOFC units to form an SOFC stack,
maintaining the fluid in communication with the assembled portion of the individual SOFC unit at a pressure that is higher than an ambient pressure;
determining a quality control parameter of the assembled portion of the individual SOFC unit in response to the pneumatic constraint; and
ascertaining health of the assembled portion of the individual SOFC unit based on the quality control parameter at multiple points in a manufacturing process by detecting a variation in a quantitative measurement of the quality control parameter of the assembled portion of the individual SOFC at the multiple points in the manufacturing process.

2. The method of claim 1, wherein the SOFC comprises a manifold in fluidic communication with the assembled portion of the individual SOFC unit.

3. The method of claim 2, wherein the manifold is coupled to a seal to regulate the fluidic communication between the manifold and the assembled portion of the individual SOFC unit.

4. The method of claim 1, wherein determining the quality control parameter at multiple points in a manufacturing process comprises determining a leak rate of the fluid.

5. The method of claim 1, wherein applying the pneumatic constraint comprises flowing the fluid in communication with the assembled portion of the individual SOFC unit at a constant flow rate.

6. The method of claim 5, wherein determining the quality control parameter at multiple points in a manufacturing process comprises determining a spatial pressure drop of the fluid in the assembled portion of the individual SOFC unit.

7. The method of claim 1, wherein the assembled portion of the individual SOFC unit comprises an electrode, an electrolyte, or a combination thereof.

8. The method of claim 7, wherein the electrode is disposed in contact with the flow field, and wherein the electrolyte is disposed on the electrode to seal the flow field.

9. The method of claim 8, further comprising an additional electrolyte disposed on the electrolyte to further seal the flow field in the assembled portion of the individual SOFC unit.

10. The method of claim 1, further comprising repeatedly inspecting the assembled portion of the individual SOFC unit.

11. The method of claim 10, wherein repeatedly inspecting the assembled portion comprises inspecting sequentially built layers of the assembled portion during manufacturing of the individual SOFC unit.

12. The method of claim 11, further comprising monitoring health of the sequentially built layers by determining a variation in the quality control parameter.

13. The method of claim 1, further comprising measuring two or more quality control parameters at multiple points in a manufacturing process in response to the pneumatic constraint.

14. The method of claim 1, wherein the ambient pressure is about 100 kPa at sea level.

15. A method for repeatedly inspecting an assembled portion of an individual solid oxide fuel cell (SOFC) unit during manufacturing of the individual SOFC unit, the method comprising:
applying a pneumatic constraint to a fluid, wherein the fluid is in communication with the assembled portion of the individual SOFC unit,
wherein the individual SOFC unit is a single unit of a SOFC prior to stacking to form an SOFC stack, and
wherein the pneumatic constraint does not comprise a vacuum;
maintaining the fluid in communication with the assembled portion of the individual SOFC unit at a pressure that is higher than an ambient pressure;
determining a quality control parameter at multiple points in a manufacturing process of the assembled portion of the individual SOFC unit in response to the pneumatic constraint; and
ascertaining health of one or more sequentially built layers of the assembled portion of the individual SOFC unit based on the quality control parameter by detecting a variation in a quantitative measurement of the quality control parameter of the assembled portion of the individual SOFC at the multiple points in the manufacturing process,
wherein the assembled portion of the individual SOFC unit comprises a metallic interconnect comprising a flow field, and wherein the SOFC comprises a manifold in fluidic communication with the assembled portion of the individual SOFC unit.

16. The method of claim 15, wherein applying the pneumatic constraint further comprises flowing the fluid in communication with the assembled portion of the individual SOFC unit at a constant flow rate.

17. The method of claim 15, wherein determining the quality control parameter at multiple points in a manufacturing process comprises determining a leak rate of the fluid, determining a spatial pressure drop of the fluid, determining a permeability of the fluid, or combinations thereof.

18. An intermediate individual solid oxide fuel cell (SOFC) unit, comprising:
an assembled portion of an individual SOFC unit comprising a metallic interconnect, wherein the metallic interconnect comprises a flow field, and
wherein the individual SOFC unit is a single unit of a SOFC prior to stacking to form an SOFC stack,
a manifold configured to be in fluidic communication with the assembled portion, a fluid in communication with the assembled portion, wherein a pneumatic constraint that does not comprise a vacuum is applied to the fluid to produce a leak,
wherein a variation of a quantitative measurement of a rate of the leak of the assembled portion of the individual SOFC is detected at multiple points in the manufacturing process, and
a pump configured to maintain the fluid in communication with the assembled portion at a higher pressure than ambient pressure.

19. The intermediate individual SOFC unit of claim 18, wherein the manifold is coupled to a seal to regulate the fluidic communication with the assembled portion of the intermediate individual SOFC unit.

20. The intermediate individual SOFC unit of claim 18, wherein the assembled portion further comprises:
   an electrode coupled to the flow field; and
   an electrolyte disposed on the electrode.

* * * * *